(12) United States Patent
Poole et al.

(10) Patent No.: US 7,448,047 B2
(45) Date of Patent: Nov. 4, 2008

(54) DATABASE SYSTEM WITH METHODOLOGY FOR PROVIDING STORED PROCEDURES AS WEB SERVICES

(75) Inventors: John F. Poole, Waterloo (CA); Mark N. Culp, Waterloo (CA); Graeme S. Perrow, Waterdown (CA); Bruce N. Hay, Waterloo (CA)

(73) Assignee: Sybase, Inc., Dublin, CA (US)

( * ) Notice: Subject to any disclaimer, the term of this patent is extended or adjusted under 35 U.S.C. 154(b) by 621 days.

(21) Appl. No.: 10/709,347

(22) Filed: Apr. 29, 2004

(65) Prior Publication Data

US 2005/0246717 A1   Nov. 3, 2005

(51) Int. Cl.
G06F 9/54 (2006.01)
G06F 7/00 (2006.01)

(52) U.S. Cl. ...................... 719/316; 707/100
(58) Field of Classification Search ................ 719/316; 707/100
See application file for complete search history.

(56) References Cited

U.S. PATENT DOCUMENTS

| | | | |
|---|---|---|---|
| 5,572,673 A | 11/1996 | Shurts | 713/200 |
| 5,632,015 A | 5/1997 | Zimowski et al. | 707/3 |
| 5,742,810 A | 4/1998 | Ng et al. | 707/4 |
| 5,768,589 A | 6/1998 | Bradley et al. | 707/2 |
| 5,862,378 A | 1/1999 | Wang et al. | 717/114 |
| 5,966,535 A | 10/1999 | Benedikt et al. | 717/147 |
| 5,978,580 A | 11/1999 | Wang et al. | 717/100 |
| 6,006,235 A | 12/1999 | Macdonald et al. | 707/103 |
| 6,014,670 A | 1/2000 | Zamanian et al. | 707/101 |
| 6,041,327 A | 3/2000 | Glitho et al. | 707/10 |
| 6,067,414 A | 5/2000 | Wang et al. | 717/106 |
| 6,125,384 A * | 9/2000 | Brandt et al. | 709/203 |
| 6,192,370 B1 | 2/2001 | Primsch | 707/103 |
| 6,327,629 B1 | 12/2001 | Wang et al. | 719/313 |
| 6,332,163 B1 | 12/2001 | Bowman-Amuah | 709/231 |
| 6,339,775 B1 | 1/2002 | Zamanian et al. | 707/101 |
| 6,356,946 B1 | 3/2002 | Clegg et al. | 709/231 |
| 6,438,594 B1 | 8/2002 | Bowman-Amuah | 709/225 |
| 6,449,657 B2 | 9/2002 | Stanbach et al. | 709/245 |
| 6,477,540 B1 | 11/2002 | Singh et al. | 707/103 |
| 6,507,834 B1 | 1/2003 | Kabra et al. | 707/2 |
| 6,594,483 B2 | 7/2003 | Nykanen et al. | 455/411 |
| 6,615,253 B1 | 9/2003 | Bowman-Amuah | 709/219 |
| 6,633,900 B1 * | 10/2003 | Khalessi et al. | 709/202 |

(Continued)

OTHER PUBLICATIONS

W3C, Web Services Description Language (WSDL) 1.1, W3C, Mar. 15, 2001.

*Primary Examiner*—Thomas Lee
*Assistant Examiner*—Abdou K Seye
(74) *Attorney, Agent, or Firm*—John A. Smart; G. Mack Riddle

(57) ABSTRACT

A database system providing stored procedures as web services is described. In one embodiment, for example, in a database system, a method of the present invention is described for providing a stored procedure as a Web service, the method comprises steps of: predefining a stored procedure to be invoked upon receiving a client request for a particular Web service; receiving an incoming request from a particular client for the particular Web service; in response to the incoming request, identifying the stored procedure that is predefined for the particular Web service; executing the identified stored procedure for generating a result set; and returning the result set back to the particular client.

34 Claims, 8 Drawing Sheets

U.S. PATENT DOCUMENTS

| | | | |
|---|---|---|---|
| 6,636,855 B2 | 10/2003 | Holloway et al. | 707/10 |
| 6,701,441 B1 | 3/2004 | Balasubramaniam et al. | 713/201 |
| 6,714,778 B2 | 3/2004 | Nykanen et al. | 455/414.1 |
| 6,735,771 B1 | 5/2004 | Houlding | 719/315 |
| 6,785,255 B2 | 8/2004 | Sastri et al. | 370/338 |
| 6,792,605 B1 | 9/2004 | Roberts et al. | 719/313 |
| 7,013,469 B2 * | 3/2006 | Smith et al. | 719/328 |
| 7,237,002 B1 * | 6/2007 | Estrada et al. | 709/203 |
| 2003/0191769 A1 * | 10/2003 | Crisan et al. | 707/100 |
| 2004/0199636 A1 * | 10/2004 | Brown et al. | 709/227 |
| 2005/0066335 A1 * | 3/2005 | Aarts | 719/316 |
| 2006/0167829 A1 * | 7/2006 | Dreyfus et al. | 707/1 |

* cited by examiner

DATABASE SYSTEM WITH METHODOLOGY FOR PROVIDING STORED PROCEDURES AS WEB SERVICES

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, size: 53124 Bytes, created: Apr. 21, 2004 12:49:26 PM; Object ID: File No. 1; Object Contents: Source code.

BACKGROUND OF INVENTION

1. Field of the Invention

The present invention relates generally to data processing environments and, more particularly, to a database system providing stored procedures as Web services.

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Seventh Edition", Addison Wesley, 2000.

With the ever-increasing popularity of the Internet, there is much interest in leveraging Internet architecture for the development of applications, including database applications. "Web Services" are self-contained modular applications that can be published and invoked over a network, such as the Internet. Web Services provide well-defined interfaces that describe the services provided. Web Services are designed to allow a loose coupling between client and server. That is, server implementations do not require clients to use a specific platform or programming language. In addition to defining interfaces in a language-neutral fashion, they are designed to allow multiple communications mechanisms as well. "Web services" as referred herein means any services capable of being served up over a Web connection (e.g., HTTP connection). This would include, for example, using SOAP (simple object access protocol) services as an RPC (remote procedure call) mechanism to make generic calls into a database and have the results returned to a Web client. However, Web services may also include arbitrary services that can be serviced (e.g., in a Web server-like fashion) over the Internet.

Currently, the only way to use Web services in conjunction with a database is through some sort of external library. Therefore, a database administrator is required to set up his or her own combination of a database, a Web server, and an external library providing Web services, including writing custom code to get all of the components to work together properly. In other words, since there is no integrated solution, today one is required to set up a variety of disparate components—none of which are internal to the database—to create one's own solution. With that approach, there is no effort to leverage the use of databases as a means to help facilitate the processing of Web services. At best, the current approach provides one with a tedious and time-consuming task.

What is needed is a solution that provides an easy-to-use approach to implementing Web services in conjunction with a database. Further, it is desirable that the solution be one that is capable of being deployed in embedded environments (e.g., providing Web services on handheld devices). The present invention fulfills this and other needs.

SUMMARY OF INVENTION

A database system providing stored procedures as web services is described. In one embodiment, for example, in a database system, a method of the present invention is described for providing a stored procedure as a Web service, the method comprises steps of: predefining a stored procedure to be invoked upon receiving a client request for a particular Web service; receiving an incoming request from a particular client for the particular Web service; in response to the incoming request, identifying the stored procedure that is predefined for the particular Web service; executing the identified stored procedure for generating a result set; and returning the result set back to the particular client.

In another embodiment, for example, a database system providing stored procedures as Web services, the system of the present invention is described that comprises: a database engine controlling a database that includes a stored procedure to be invoked upon receiving a request for a particular Web service; a communications layer for receiving an incoming request from a particular client for the particular Web service; an HTTP server for parsing and validating the incoming request; a request layer for identifying and executing the stored procedure for the particular Web service, for generating a result set; and a presentation layer for returning the result set back to the particular client.

DETAILED DESCRIPTION

Glossary

Figure 1:
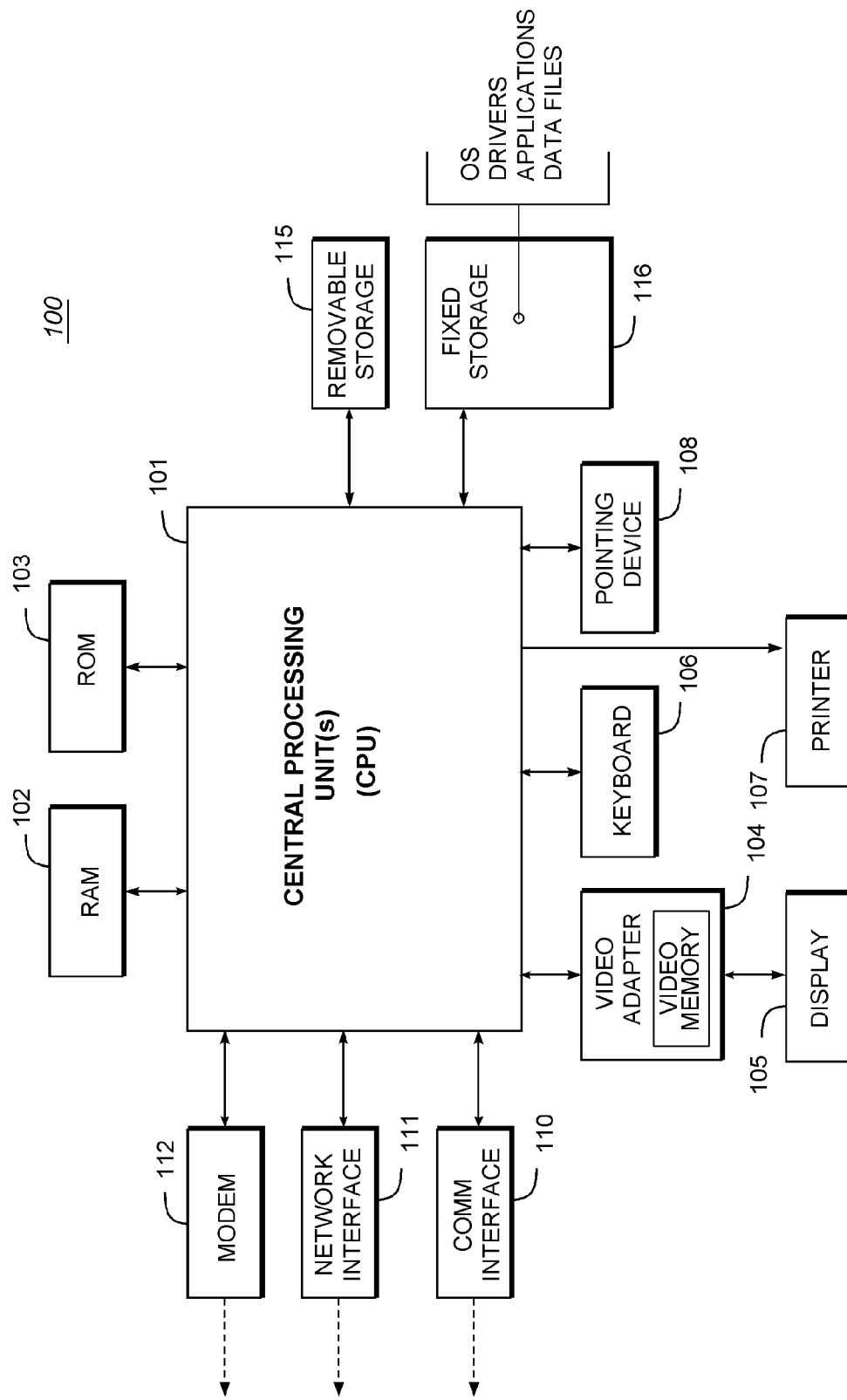
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

DISH: DISH stands for Deduce Ideal SOAP Handler. DISH services act as a proxy for a number of SOAP services. The DISH service also generates a WSDL file for each of the SOAP services for which it acts as a proxy.

HTML: HTML stands for HyperText Markup Language, the authoring language used to create documents on the World Wide Web. HTML defines the structure and layout of a Web document by using a variety of tags and attributes. For further description of HTML, see e.g., "HTML 4.01 Specification", a World Wide Web consortium recommendation dated Dec. 24, 1999, the disclosure of which is hereby incorporated by reference. A copy of this specification is available via the Internet (e.g., currently at www.w3.org/TR/REC-html40).

HTTP: HTTP is the acronym for HyperText Transfer Protocol, which is the underlying communication protocol used by the World Wide Web on the Internet. HTTP defines how messages are formatted and transmitted, and what actions Web servers and browsers should take in response to various commands. For example, when a user enters a URL in his or her browser, this actually sends an HTTP command to the Web server directing it to fetch and transmit the requested Web page. Further description of HTTP is available in "RFC 2616: Hypertext Transfer Protocol—HTTP/1.1," the disclosure of which is hereby incorporated by reference. RFC 2616 is available from the World Wide Web Consortium (W3C), and is available via the Internet (e.g., currently at www.w3.org/Protocols/). Additional description of HTTP is available in the technical and trade literature, see e.g., Stallings, W., "The Backbone of the Web," BYTE, October 1996, the disclosure of which is hereby incorporated by reference.

Network: A network is a group of two or more systems linked together. There are many types of computer networks, including local area networks (LANs), virtual private networks (VPNs), metropolitan area networks (MANs), campus area networks (CANs), and wide area networks (WANs) including the Internet. As used herein, the term "network" refers broadly to any group of two or more computer systems or devices that are linked together from time to time (or permanently).

Relational database: A relational database is a collection of data items organized as a set of formally-described tables from which data can be accessed or reassembled in many different ways without having to reorganize the database tables. The relational database was invented by E. F. Codd at IBM in 1970. A relational database employs a set of tables containing data fitted into predefined categories. Each table (which is sometimes called a relation) contains one or more data categories in columns. The standard user and application program interface to a relational database is the structured query language (SQL), defined below.

SOAP: SOAP stands for Simple Object Access Protocol, which is a standard and lightweight protocol for exchanging information in a decentralized, distributed environment. It uses XML to encode remote procedure calls, and typically uses HTTP as a communications protocol. For more information about SOAP, see e.g., "SOAP Version 1.2 Part 1: Messaging Framework" and "SOAP Version 1.2 Part 2: Adjuncts," both World Wide Web Consortium (W3C) candidate recommendations dated Dec. 19, 2002, the disclosure of which are hereby incorporated by reference. Copies of these documents are available from the W3C, and are available via the Internet (e.g., currently at www.w3.org/2002/ws).

SQL: SQL stands for Structured Query Language. The original version called SEQUEL (structured English query language) was designed by IBM in the 1970's. SQL-92 (or SQL/92) is the formal standard for SQL as set out in a document published by the American National Standards Institute in 1992; see e.g., "Information Technology—Database languages—SQL", published by the American National Standards Institute as American National Standard ANSI/ISO/IEC 9075: 1992, the disclosure of which is hereby incorporated by reference. SQL-92 was superseded by SQL-99 (or SQL3) in 1999; see e.g., "Information Technology—Database Languages—SQL, Parts 1-5" published by the American National Standards Institute as American National Standard INCITS/ISO/IEC 9075-(1-5)-1999 (formerly ANSI/ISO/IEC 9075-(1-5)-1999), the disclosure of which is hereby incorporated by reference.

TCP/IP: TCP/IP stands for Transmission Control Protocol/Internet Protocol, the suite of communications protocols used to connect hosts on the Internet. TCP/IP uses several protocols, the two main ones being TCP and IP. TCP/IP is built into the UNIX operating system and is used by the Internet, making it the de facto standard for transmitting data over networks. For an introduction to TCP/IP, see e.g., "RFC 1180: A TCP/IP Tutorial", the disclosure of which is hereby incorporated by reference. A copy of RFC 1180 is available via the Internet (e.g., currently at www.ietf.org/rfc/rfc1180.txt).

URI: Uniform Resource Identifiers (URIs) are short strings that identify resources on the Web including documents, images, files, services, and other resources. URIs are also known as URLs.

URL: URL is an abbreviation of Uniform Resource Locator, the global address of documents and other resources on the World Wide Web. The first part of the address indicates what protocol to use, and the second part specifies the IP address or the domain name where the resource is located.

WSDL: WSDL stands for Web Services Description Language, which is an XML format for describing network services as a set of endpoints operating on messages containing either document-oriented or procedure-oriented information. The operations and messages are described abstractly, and then bound to a concrete network protocol and message format to define an endpoint. Related concrete endpoints are combined into abstract endpoints (services). WSDL is extensible to allow description of endpoints and their messages regardless of what message formats or network protocols are used to communicate. For further information on WSDL, see e.g., "Web Services Description Language (WSDL) 1.1", W3C Note, Mar. 15, 2001, the disclosure of which is hereby incorporated by reference. A copy of this document is available via the Internet (e.g., currently at www.w3.org/TR/wsdl).

XML: XML stands for Extensible Markup Language, a specification developed by the World Wide Web Consortium (W3C). XML is a pared-down version of the Standard Generalized Markup Language (SGML), a system for organizing and tagging elements of a document. XML is designed especially for Web documents. It allows designers to create their own customized tags, enabling the definition, transmission, validation, and interpretation of data between applications and between organizations. For further description of XML, see e.g., "Extensible Markup Language (XML) 1.0", (2nd Edition, Oct. 6, 2000) a recommended specification from the W3C, the disclosure of which is hereby incorporated by reference. A copy of this specification is available via the Internet (e.g., currently at www.w3.org/TR/REC-xml).

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Computer-Based Implementation

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like.

Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
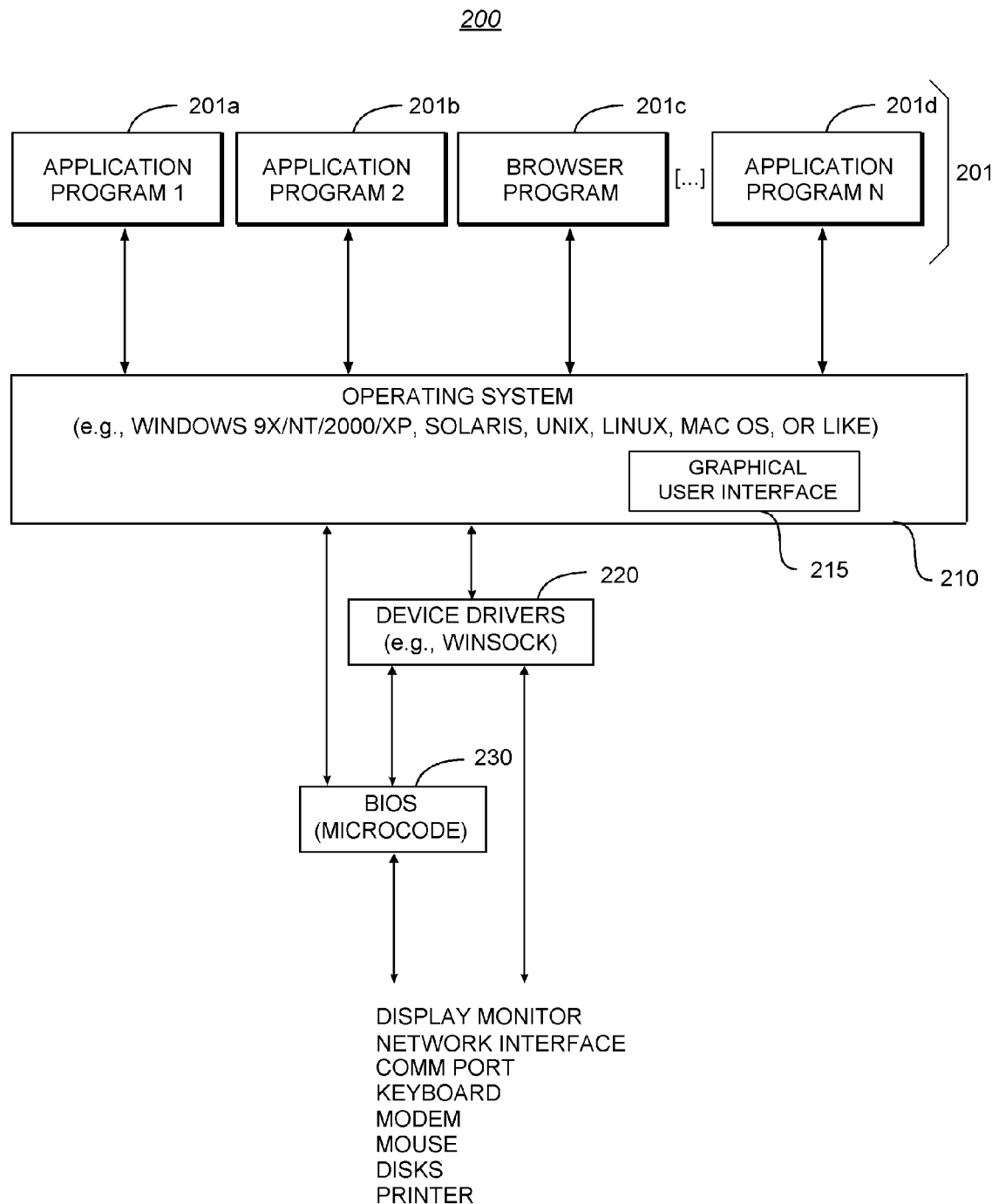
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of downloadable processor-executable instructions, for example, for downloading and installation from an Internet location (e.g., Web server).

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

Client-Server Database Management System

Figure 3:
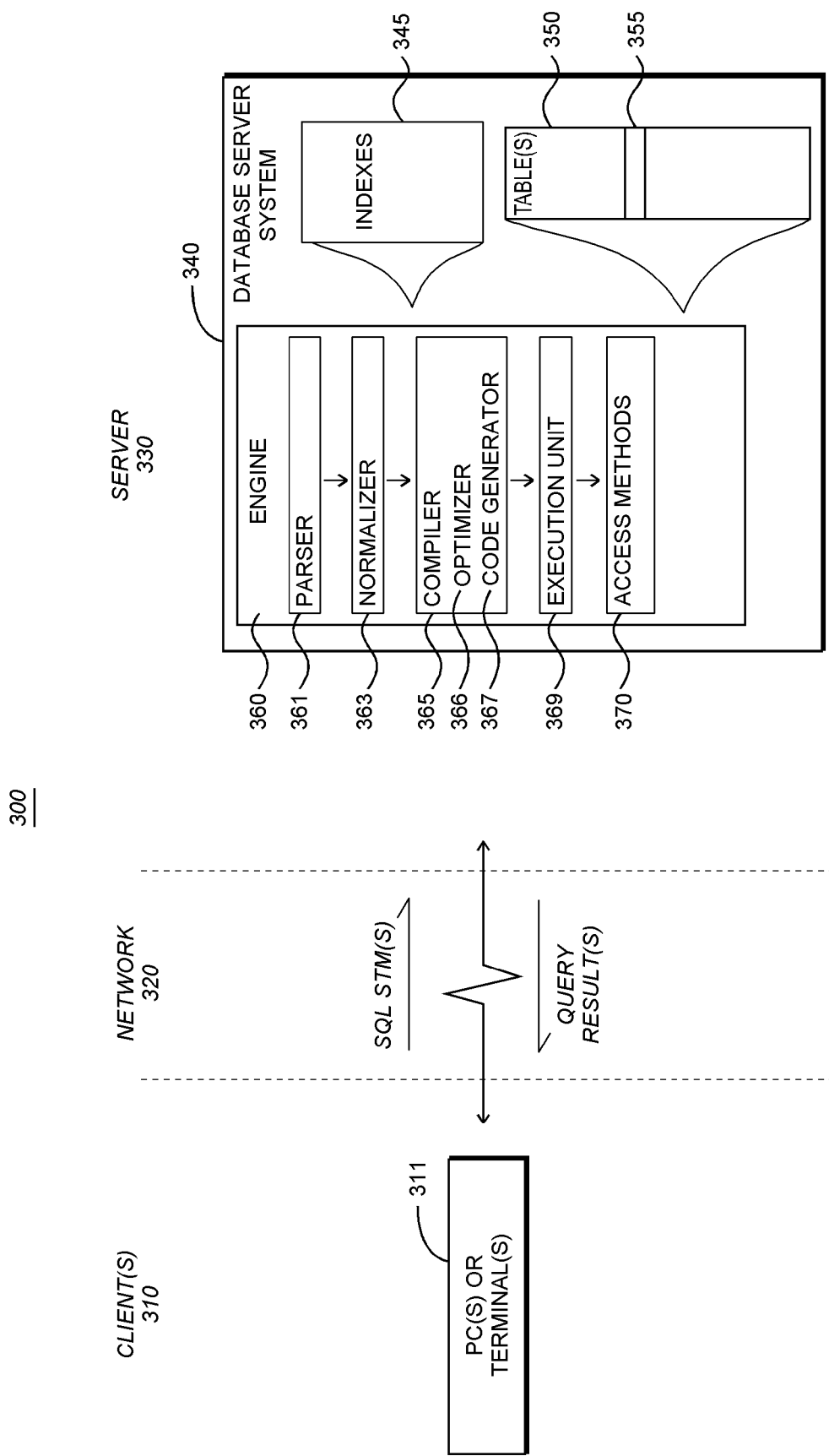
FIG. 3 illustrates the general structure of a client/server database system suitable for implementing the present invention.

While the present invention may operate within a single (standalone) computer (e.g., system 100 of FIG. 1), the present invention is preferably embodied in a multi-user computer system, such as a client/server system. FIG. 3 illustrates the general structure of a client/server database system 300 suitable for implementing the present invention. As shown, the system 300 comprises one or more client(s) 310 connected to a server 330 via a network 320. Specifically, the client(s) 310 comprise one or more standalone terminals 311 connected to a database server system 340 using a conventional network. In an exemplary embodiment, the terminals 311 may themselves comprise a plurality of standalone workstations, dumb terminals, or the like, or comprise personal computers (PCs) such as the above-described system 100. Typically, such units would operate under a client operating system, such as a Microsoft® Windows client operating system (e.g., Microsoft® Windows 95/98, Windows 2000, or Windows XP).

The database server system 340, which comprises Sybase® Adaptive Server® Anywhere (available from Sybase, Inc. of Dublin, Calif.) in an exemplary embodiment, generally operates as an independent process (i.e., independently of the clients), running under a server operating system such as Microsoft® Windows NT, Windows 2000, or Windows XP (all from Microsoft Corporation of Redmond, WA), UNIX (Novell), Solaris (Sun), or Linux (Red Hat). The network 320 may be any one of a number of conventional network systems, including a Local Area Network (LAN) or Wide Area Network (WAN), as is known in the art (e.g., using Ethernet, IBM Token Ring, or the like). The network 320 includes functionality for packaging client calls in the well-known Structured Query Language (SQL) together with any parameter information into a format (of one or more packets) suitable for transmission to the database server system 340.

Client/server environments, database servers, and networks are well documented in the technical, trade, and patent literature. For a discussion of Sybase®-branded database servers and client/server environments generally, see, e.g., Nath, A., "The Guide to SQL Server", Second Edition, Addison-Wesley Publishing Company, 1995. For a description of Sybase® Adaptive Server® Anywhere Studio, see, e.g., "Adaptive Server Anywhere 9.0.1: Core Documentation Set," available from Sybase, Inc. of Dublin, CA. This product documentation is available via the Internet (e.g., currently at sybooks.sybase.com/aw.html). The disclosures of the foregoing are hereby incorporated by reference.

In operation, the client(s) 310 store data in, or retrieve data from, one or more database tables 350, as shown at FIG. 3. Data in a relational database is stored as a series of tables, also called relations. Typically resident on the server 330, each table itself comprises one or more "rows" or "records" (tuples) (e.g., row 355 as shown at FIG. 3). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number, and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of the Structured Query Language (SQL), which is a language allowing users and administrators to create, manipulate, and access data stored in the database. The syntax of SQL is well documented; see, e.g., the above-mentioned "An Introduction to Database Systems". SQL statements may be divided into two categories: data manipulation language (DML), used to read and write data; and data definition language (DDL), used to describe data and maintain the database. DML statements are also called queries. In operation, for example, the clients 310 issue one or more SQL commands to the server 330. SQL commands may specify, for instance, a query for retrieving particular data (i.e., data records meeting the query condition) from the database table(s) 350. In addition to retrieving the data from database server table(s) 350, the clients 310 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 310 (via network 320) are processed by the engine 360 of the database server system 340. The engine 360 itself comprises a parser 361, a normalizer 363, a compiler 365, an execution unit 369, and an access methods 370. Specifically, the SQL statements are passed to the parser 361 which converts the statements into a query tree—a binary tree data structure which represents the components of the query in a format selected for the convenience of the system. In this regard, the parser 361 employs conventional parsing methodology (e.g., recursive descent parsing).

The query tree is normalized by the normalizer 363. Normalization includes, for example, the elimination of redundant data. Additionally, the normalizer 363 performs error checking, such as confirming that table names and column names which appear in the query are valid (e.g., are available and belong together). Finally, the normalizer 363 can also look-up any referential integrity constraints which exist and add those to the query.

After normalization, the query tree is passed to the compiler 365, which includes an optimizer 366 and a code generator 367. The optimizer 366 is responsible for optimizing the query tree. The optimizer 366 performs a cost-based analysis for formulating a query execution plan. The optimizer will, for instance, select the join order of tables (e.g., when working with more than one table), and will select relevant indexes (e.g., when indexes are available). The optimizer, therefore, performs an analysis of the query and selects the best execution plan, which in turn results in particular access methods being invoked during query execution. It is possible that a given query may be answered by tens of thousands of access plans with widely varying cost characteristics. Therefore, the optimizer must efficiently select an access plan that is reasonably close to an optimal plan. The code generator 367 translates the query execution plan selected by the query optimizer 366 into executable form for execution by the execution unit 369 using the access methods 370.

All data in a typical relational database system is stored in pages on a secondary storage device, usually a hard disk. Typically, these pages may range in size from 1 Kb to 32 Kb, with the most common page sizes being 2 Kb and 4 Kb. All input/output operations (I/O) against secondary storage are done in page-sized units—that is, the entire page is read/written at once. Pages are also allocated for one purpose at a time: a database page may be used to store table data or used for virtual memory, but it will not be used for both. The memory in which pages that have been read from disk reside is called the cache or buffer pool.

I/O to and from the disk tends to be the most costly operation in executing a query. This is due to the latency associated with the physical media, in comparison with the relatively low latency of main memory (e.g., RAM). Query performance can thus be increased by reducing the number of I/O operations that must be completed. This can be done by using data structures and algorithms that maximize the use of pages that are known to reside in the cache. Alternatively, it can be done by being more selective about what pages are loaded into the cache in the first place. An additional consideration with respect to I/O is whether it is sequential or random. Due to the construction of hard disks, sequential I/O is much faster then random access I/O. Data structures and algorithms encouraging the use of sequential I/O can realize greater performance.

For enhancing the storage, retrieval, and processing of data records, the server 330 maintains one or more database indexes 345 on the database tables 350. Indexes 345 can be created on columns or groups of columns in a table. Such an index allows the page containing rows that match a certain condition imposed on the index columns to be quickly located on disk, rather than requiring the engine to scan all pages in a table to find rows that fulfill some property, thus facilitating quick access to the data records of interest. Indexes are especially useful when satisfying equality and range predicates in queries (e.g., a column is greater than or equal to a value) and "order by" clauses (e.g., show all results in alphabetical order by a given column).

A database index allows the records of a table to be organized in many different ways, depending on a particular user's needs. An index key value is a data quantity composed of one or more fields from a record which are used to arrange (logically) the database file records by some desired order (index expression). Here, the column or columns on which an index is created form the key for that index. An index may be constructed as a single disk file storing index key values together with unique record numbers. The record numbers are unique pointers to the actual storage location of each record in the database file.

Indexes are usually implemented as multi-level tree structures, typically maintained as a B-Tree data structure. Pointers to rows are usually stored in the leaf nodes of the tree, so an index scan may entail reading several pages before reaching the row. In some cases, a leaf node may contain the data record itself. Depending on the data being indexed and the nature of the data being stored, a given key may or may not be intrinsically unique. A key that is not intrinsically unique can be made unique by appending a RID. This is done for all non-unique indexes to simplify the code for index access. The traversal of an index in search of a particular row is called a probe of the index. The traversal of an index in search of a group of rows fulfilling some condition is called a scan of the index. Index scans frequently look for rows fulfilling equality or inequality conditions; for example, an index scan would be used to find all rows that begin with the letter 'A'.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., database server) that communicates with one or more "clients" (e.g., personal computers such as the above-described system 100). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Stored Procedures as Web Services

Overview

In accordance with the present invention, a communication port (e.g., HTTP) is opened up directly on the database engine itself (activated via a command line switch). Additionally, a lightweight HTTP server is built directly into the database engine. The built-in HTTP server, in this configuration, may translate incoming client requests into stored procedure calls, complete with database features (e.g., authentication, mapping, and the like). The result set that is returned from a particular stored procedure invocation may then be formatted appropriately as an HTTP response, which may then be returned back to the client. The system includes a mapping table that maps a given client request to a particular stored procedure call(s).

The database developer authors the individual stored procedures that may be invoked in this manner. During system use, when a developer creates a particular Web service of interest, he or she specifies a particular stored procedure that is invoked (via a URL) to service client requests for that web service. Therefore, with the underlying functionality provided by the system of the present invention, the developer has the flexibility to create any arbitrary number of Web services that he or she may desire.

System Components

Figure 4:
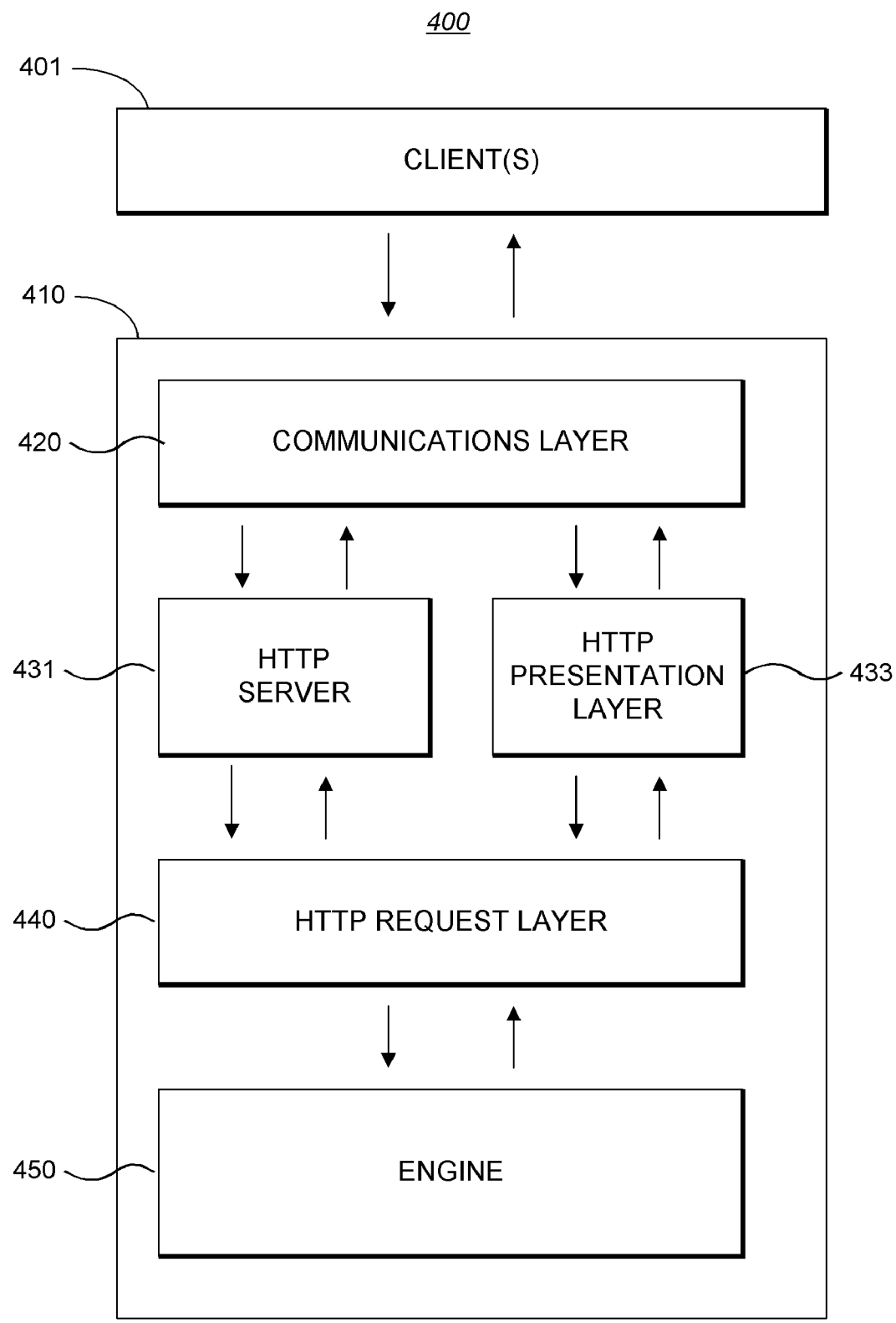
FIG. 4 is a high-level block diagram illustrating an online database environment of the present invention for providing stored procedures as Web services.

FIG. 4 is a high-level block diagram illustrating an online database environment 400 of the present invention for providing stored procedures as Web services. As shown, the environment 400 includes one or more clients 401 that interact with a database server 410. The database server 410 includes a communications layer 420, an HTTP server 431, an HTTP presentation layer 433, an HTTP request layer 440, and a database engine 450. The client(s) 401 represents anything that can issue requests and receive a response via HTTP. Examples include a database application, a Web browser, run-time library code (e.g., portion of Microsoft NET framework issuing SOAP requests), a PERL script accessing XML over HTTP, or the like. A particular advantage of the present invention is that it allows a wide variety of disparate clients to communicate with the system.

The communications layer 420 handles incoming requests at the database server 410. The communications layer 420 simply serves to handle communications into and out of the database server. Accordingly, the layer also handles issues related to obtaining a communication socket (e.g., Winsock socket), and handling timeout or error conditions. This may be implemented using a standard socket-based communication library.

Requests coming into the communications layer 420 are handed off to the HTTP server 431. Note that the HTTP server 431 resides in the same executable space as the database engine 450. Upon receiving a given request, the HTTP server 431 examines the request to make sure that it is well formed and valid. For example, in the currently preferred embodiment (for servicing HTTP requests), all incoming requests must have valid HTTP headers. For invalid requests, the HTTP server 431 returns an error message to the communications layer 420, which in turn returns an error message to the client 401. If an incoming request passes the validity check, the HTTP server 431 then passes the request to the HTTP request layer 440, which performs the bulk of the processing.

At the HTTP request layer 440, the request, which is in HTTP format, is translated into a form that can be used by the database engine 450. The database engine 450 is a SQL relational database management system (RDBMS), which in the current embodiment is the database engine from assignee Sybase's Adaptive Server Anywhere Studio version 9 (available from Sybase, Inc. of Dublin, CA). The HTTP request layer 440 creates a temporary pseudo connection to the database engine 450, and the HTTP presentation layer 433 is set up to receive the results of the stored procedure call. From the perspective of the database engine 450, the connection appears to be simply an external client connection. Now, the HTTP request layer 440 can issue the appropriate stored procedure call, making sure that the call executes successfully.

Importantly, the HTTP presentation layer 433 is set up to provide appropriate formatting of the stored procedure results, such that those results may be returned to the client 401 over the HTTP connection. For example, if the system is dealing with a SOAP response, the HTTP presentation layer 433 (in conjunction with the HTTP request layer 440) will format the result set into a SOAP response. If the system is simply returning XML, the HTTP presentation layer 433 will format the result set into an XML document. Here, the HTTP presentation layer 433 handles character set and encoding issues, such as ensuring that correct characters are escaped.

Internally, the HTTP presentation layer 433 includes a generic presentation layer that handles issues that are common to all HTTP presentation format types. On top of this, the HTTP presentation layer 433 includes various drivers for the different formats, such as a driver for SOAP format, one for XML format, one for WSDL format, and the like. The HTTP presentation layer 433 also includes a "raw" presentation format which simply provides a passthrough format option (i.e., no formatting); this is useful when serving up raw HTML pages. The response typically includes an HTTP header, but the body itself may be any arbitrary format desired (for the task at hand).

Preferred Syntax

In accordance with the present invention, Web service statements are embodied using the following syntax:

Web Service statement syntax:

```
CREATE SERVICE identifier attributes [ AS statement ]
AL-
TER SERVICE identifier attributes [ AS { statement | NULL } ]
DROP SERVICE identifier
COMMENT ON SERVICE identifier IS comment
where, Web Service attributes include:
TYPE string
AUTHORIZATION { ON | OFF }
SECURE { ON | OFF }
USER { user | NULL }
URL [ PATH ] { ON | OFF | ELEMENTS }
USING identifier
```

As shown, these four new statements for controlling Web services are SQL-type statements that may be implemented as SQL extensions. Importantly, in the currently preferred embodiment the built-in HTTP server is entirely configured and maintained through the use of SQL statements and a command line switch. In the preferred embodiment the command line switch -xs is used to control how the server handles web services, such as which port to listen on for web service requests, and which databases should handle the web service requests. However, the Web services may be entirely configured and maintained through the use of SQL statements.

The CREATE SERVICE command is issued to indicate that the system should create a new Web service with a particular "identifier" (i.e., name) that calls a particular stored procedure. The stored procedure itself need not be predefined at this point, as the system may look up the target stored procedure dynamically at runtime. The remaining statements, ALTER SERVICE, DROP SERVICE, and COMMENT ON SERVICE, operate in a familiar, self-explanatory SQL fashion (e.g., similar to ALTER TABLE, DROP TABLE).

The TYPE attribute describes the type of service. In the currently preferred embodiment, the following types are supported:

XML query service; the result set is returned as XML.
HTML query service; the result set is returned as HTML.
RAW query service; the result set is returned as-is.
SOAP query service; the request is sent as a SOAP request and the result set is returned as a SOAP response.
DISH proxy service; DISH services act as proxies for SOAP services. DISH services also generate WSDL for SOAP services.

The AUTHORIZATION attribute specifies a level of authorization (e.g., analogous to SQL roles). More particularly, this indicates whether the client must authenticate with the engine (e.g., using HTTP authentication) in order to access the service. SECURE specifies whether a secure communications channel is required. If SECURE is ON, then the Web service can only be accessed over a secure socket layer (SSL) connection. USER ties in with AUTHORIZATION. If AUTHORIZATION is OFF, then USER specifies which database user the stored procedure is run under. If AUTHORIZATION is ON, then USER specifies which group(s) of users in the database are authorized to execute the Web service.

The URL attribute specifies how the URL itself is handled by the Web service. In the currently preferred embodiment, the system allows parameters to be passed as part of the URL. Additionally, "URL ELEMENTS" and "URL ON" indicate that part of the URL may contain parameters to the target stored procedure. This helps with the determination of how an incoming request is handled. Consider the following sample statements:

```
CREATE SERVICE "a" . . . URL ELEMENTS
CREATE SERVICE "a/b" . . . URL ON
CREATE SERVICE "a/c" . . . URL OFF
Given those statements, the following URLs are handled as
shown:
http://localhost/a/d/e
- handled by "a"
- url1 = "d", url2 = "e"
http://localhost/a/b/c/d
- handled by "a/b"
- url = "c/d"
http://localhost/a/c/c
- handled by "a" (not "a/c" since URL is OFF)
- url1 = "c", url2 = "c"
```

The USING attribute is used in conjunction with a DISH service. When one creates a number of SOAP procedures, they may be described by a DISH service, which generates the corresponding WSDL. USING allows one to group a number of SOAP procedures under one DISH service (i.e., provide names pace-type functionality).

URIs used to access HTTP or HTTPS services are commonly called URLs. The URLs follow the patterns familiar to anyone regularly browsing the Web. As a result, users browsing through a database server need not be aware that their requests are not being handled by a traditional stand-alone Web server. Although they do not look unusual, URLs are necessarily interpreted a bit differently when sent to a database server. In addition, they are interpreted differently depending on which options are specified when the Web services are created in the database server. The general syntax of the URL is as follows:

<scheme>://<host>[:<port>]/[<dbn>/][<service>][?<params>]

where, scheme: http or https
host: hostname or IP address of the server
port: port number the server is listening on
dbn: database that contains the service
service: name of the service
params: list of service parameters When the server receives a request, this syntax helps to determine which service is in fact going to be accessed. Like all standard HTTP requests, the start of the URL contains the host name or IP number and, optionally, a port number. The IP address or host name, and port specified should be the one on which the database server is listening.

The next token (dbn), between the slashes, is the name of a database containing the service. After the database name, the next portion of the URL is the service name. This service must exist in the specified database. The service name may extend beyond the next slash character because Web service names can contain slash characters. The system matches the remainder of the URL with the defined services. If the URL provides no service name, the database server looks for a service named "root." If the named service, or the root service, is not defined, the server returns a "404 Not Found" error. However, root services may be defined to serve a role analogous to the role of index.html pages in many traditional Web servers. Root services are useful for creating home pages because they can handle URL requests that contain only the address of a Web site.

Depending on the type of the target service, parameters can be supplied in different ways. Parameters to HTML, XML, and RAW services can be passed in any of the following ways:

appended to the URL
supplied as an explicit parameters list
supplied as POST data in a POST request Parameters to SOAP and DISH services should be included as part of a standard SOAP request as values supplied in other ways are generally ignored. To access parameter values, parameters should be given names. These host variable names, prefixed with a colon (:), may be included in the statement that forms part of the Web service definition. For example, a statement that calls the procedure "place_order" may require product identification number and size parameters as follows:

call place_order(:product, :quantity)

Variables in HTTP requests come from one of two sources. First, the URL may include a query, which is a list of "name=value" pairs separated by the "&" character. This list is introduced by a question mark. GET requests are formatted in this manner. If present, the named variables are defined and assigned the corresponding values.

The second source is through the URL path. Setting the URL PATH to either ON or ELEMENTS causes the portion of the path following the service name to be interpreted as variable values. This option allows URLs to appear to be requesting a file in a particular directory, as would be the case on a traditional file-based Web site, rather than something stored inside a database. For example, the URL http://localhost/gallery/sunset.jpg appears to request the file sunset.jpg from a directory named gallery, but instead asks the gallery service to retrieve a picture from a database table. The parameter passed in HTTP requests depends on the setting of the URL PATH:

OFF: No path parameters are permitted after the service name.

ON: All path elements after the service name are assigned to the variable URL.

ELEMENTS: The remainder of the URL path is split at the slash characters into a list of up to 10 elements. These values are assigned the variables URL1, URL2, URL3, ..., URL10. If there are fewer than 10 values, the remaining variables are set to NULL. Specifying more than ten variables causes an error.

Apart from the location in which they are defined, there is no difference between variables. HTTP variables can all be accessed and used the same way. For example, the values of variables such as URL1 are accessed in the same way as parameters that appear as part of a query, such as "?picture=sunset.jpg".

Detailed Operation

Methodology

The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

Figure 5A:
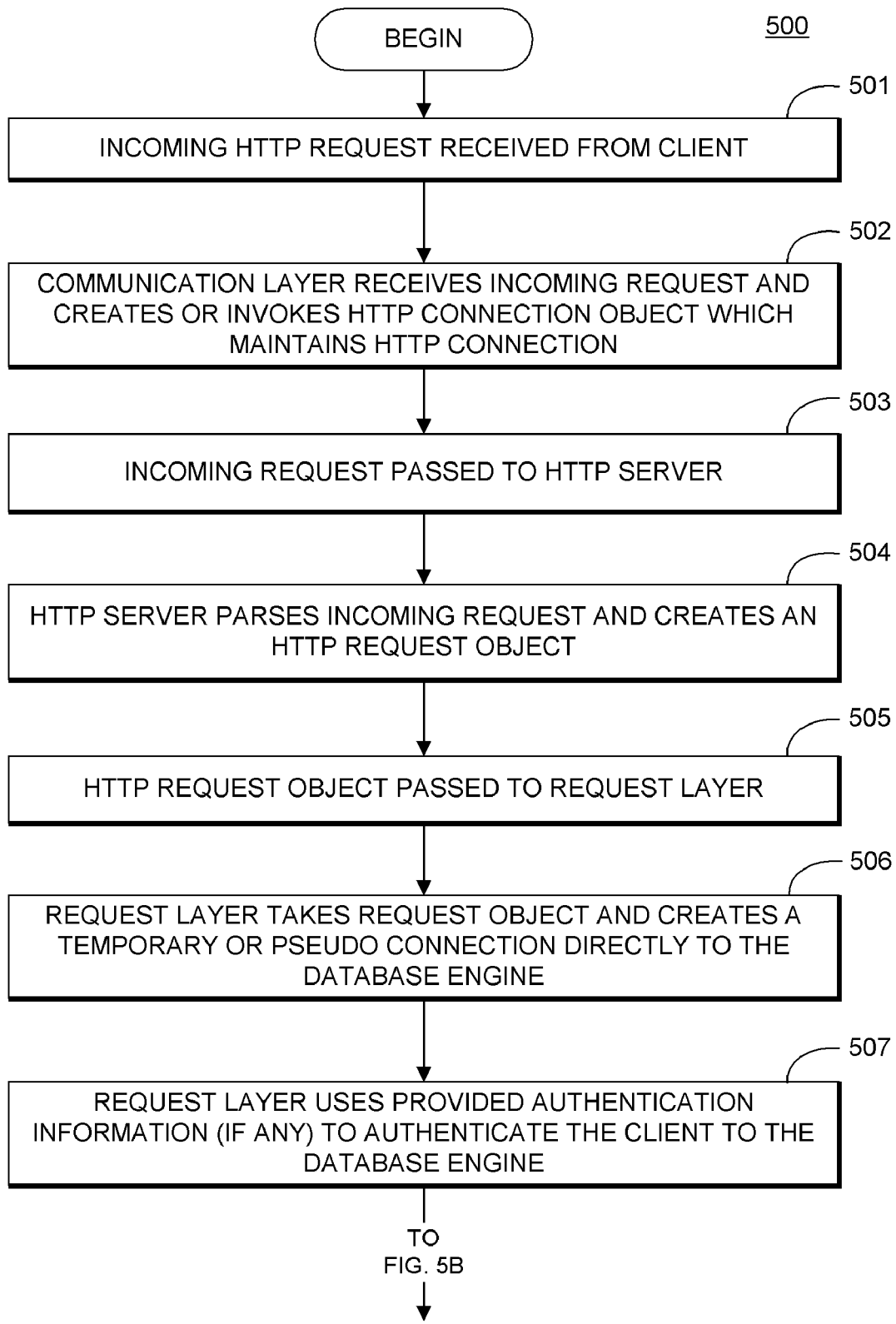
FIGS. 5A-B comprise a single flowchart illustrating the methodology of the present invention for providing stored procedures as Web services.
Figure 5B:
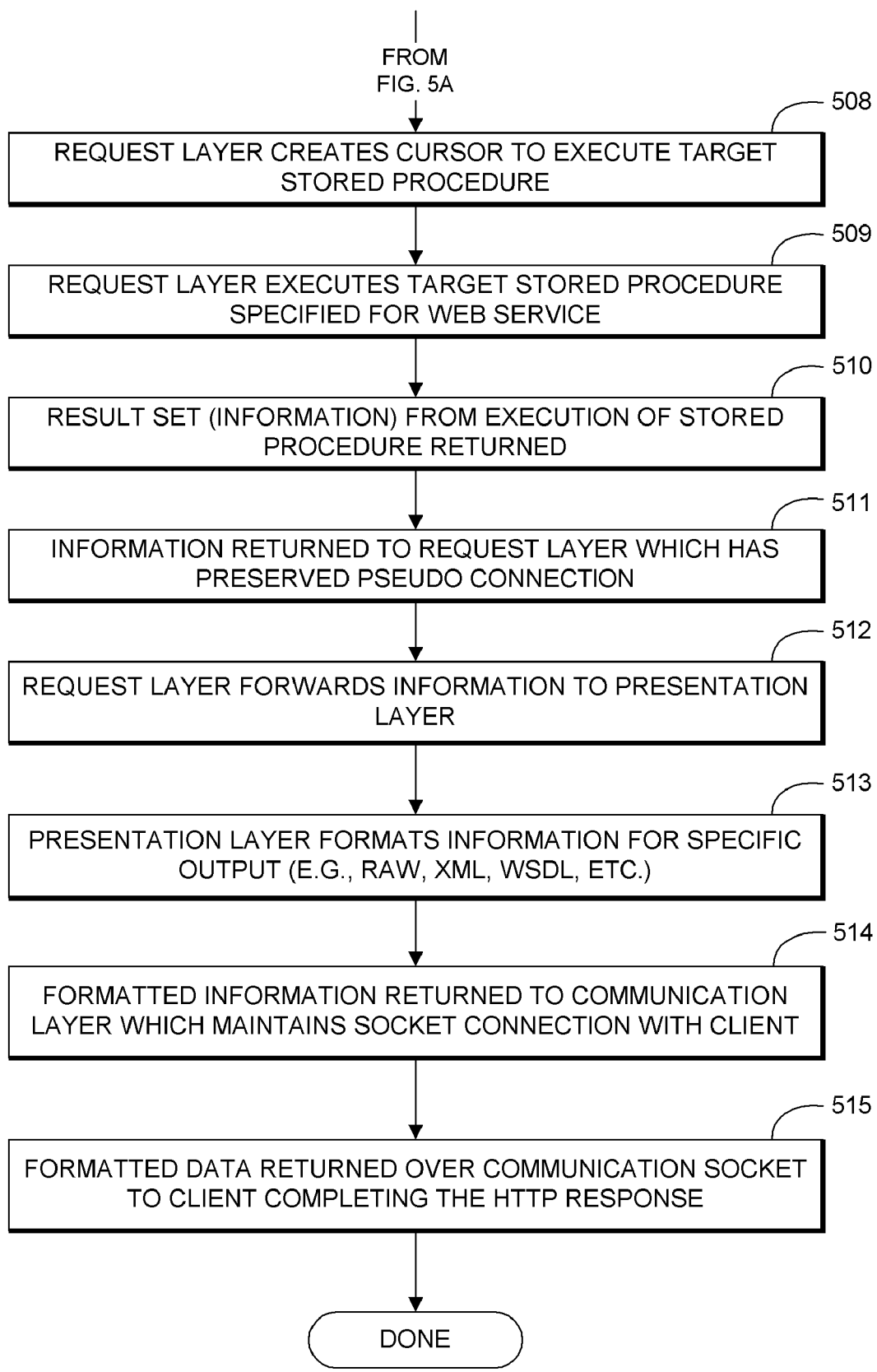

FIGS. 5A-B comprise a single flowchart 500 illustrating the methodology of the present invention for providing stored procedures as Web services. At the outset, an incoming HTTP request is received from a client, as indicated at step 501. The communication layer in the database system receives this incoming request (on the socket layer that is listening for HTTP requests), at step 502. During the step, the communication layer will maintain the integrity of the communication socket (e.g., handling error conditions and the like). Internally, this functionality is manifested through an HTTP Listener object that sits on the socket waiting for incoming HTTP requests. When a request comes in, the HTTP Listener object creates or invokes an HTTP Connection object, which maintains a corresponding HTTP connection. Information passed back and forth between the client and the database engine flows over this HTTP connection.

The incoming request is passed to the built-in HTTP server, as indicated at step 503. At this point, the HTTP server parses the request to ensure that it is well formed. Additionally, the HTTP server waits to receive the entire request before presenting it to the database engine. The HTTP server is the portion of the system that understands HTTP protocol. Therefore, it is the component that determines which Web service is being accessed, and is responsible for correctly parsing the information contained within the HTTP header and HTTP body (of the HTTP request). More particularly, the HTTP server creates an HTTP Request object, as indicated at step 504. This object includes member fields that store information indicating which Web service is being accessed and what are the particular parameters being passed.

The HTTP Request object is now ready to be passed to the HTTP request layer, as shown at step 505. The request layer takes the HTTP Request object and creates a temporary or pseudo connection directly into the database engine itself, at step 506. As previously-mentioned, the pseudo connection appears as an outside client to the database engine. The request layer uses the provided authentication information (if any) to authenticate the client to the database engine, as indicated at step 507. Now, at step 508, the request layer may create a cursor to execute the target stored procedure (associated with the identified Web service); at this point, the request layer will fill in any necessary parameters for the stored procedure, using the parameter information currently stored in the HTTP Request object. Next, the request layer will execute the corresponding (target) stored procedure specified for the requested Web service, as shown at step 509. This stored procedure may include any valid SQL statement (e.g., including SELECT, INSERT, UPDATE, and the like), and may invoke other available stored procedures (e.g., nested calls to one or more other stored procedures). The execution of the stored procedure occurs asynchronously (with respect to the incoming client requests); this is achieved by queuing up (at the HTTP server) incoming client requests, which are then processed asynchronously. Therefore, multiple requests may come in from a given client even though some of that client's prior requests are still queued up for processing. As a result of the stored procedure execution, a result set may be returned from the stored procedure, as indicated at step 510. (If no result set is specified for return from the stored procedure, the method at this point simply returns a null set.)

Through the HTTP Requests object, the target stored procedure has access to all of the HTTP headers, which may include additional parameters or variables. Parameters are initially supplied as:

part of the URL (URL {ON|ELEMENTS}) part of the explicit parameter list (e.g, http://localhost/service?x=y)

part of the POST data part of the SOAP request

Parameters are declared by specifying host variables:

CREATE SERVICE . . . AS CALL foo(:bar)

The value of the parameter "bar" is passed as the first parameter to the procedure "foo".

In the currently preferred embodiment, this access to parameter information in the HTTP Request object is provided by internal SQL stored procedures and built-in functions:

http_header(name): built-in function that gets the value of an http request header next_http_header(name): built-in function that gets the next http request header name; useful for iterating over request headers dbo.sa_set_http_header(name, value): internal stored procedure (defined when one's database is initialized) that sets the value of an http response header dbo.sa_set_http_option(name, value): internal stored procedure (defined when one's database is initialized) that sets the value of an http option http_variable(name [, i]): built-in function that gets the ith value of the named host variable next_http_variable(name): built-in function that gets the next http host variable name; useful for iterating over host variables When returning from execution, a Web service stored procedure may also return (in addition to a result set) additional information for placement in the HTTP headers (for return to the client). Therefore, this mechanism may be used to pass other information from a given stored procedure back to the client, including returning output variables (parameters), cookies, or the like. In the currently preferred embodiment, the setting of output information (in HTTP headers) is done by calling into an internal (system) stored procedure "dbo.sa_set_http_header" (from the developer's Web service stored procedure).

At step 511, the information is returned back to the request layer, which has preserved the pseudo connection. In the currently preferred embodiment, the information is streamed back to the request layer as it becomes available. Upon receiving this information, the request layer proceeds to forward it on to the presentation layer, at step 512. Now, the presentation layer may format the information for a specific output (e.g., raw, XML, WSDL, etc.), as indicated at step 513. Internally, the returning data gets routed to the appropriate format class, which manipulates the presentation of the data in a way appropriate for the target format (e.g., XML document for XML format, SOAP envelope for SOAP format, etc.). Now, the system has a properly formatted data object that is ready to be returned to the client. Accordingly, at step 514, the formatted data is returned to the communication layer, which maintains socket connections with various clients. Finally, at step 515, the formatted data object is returned over the communication socket back to the client, thus completing the HTTP response. The HTTP response itself is stateless, meaning that it is independent of other HTTP responses that may be returned over the communication socket to the client.

Service Determination

Figure 6A:
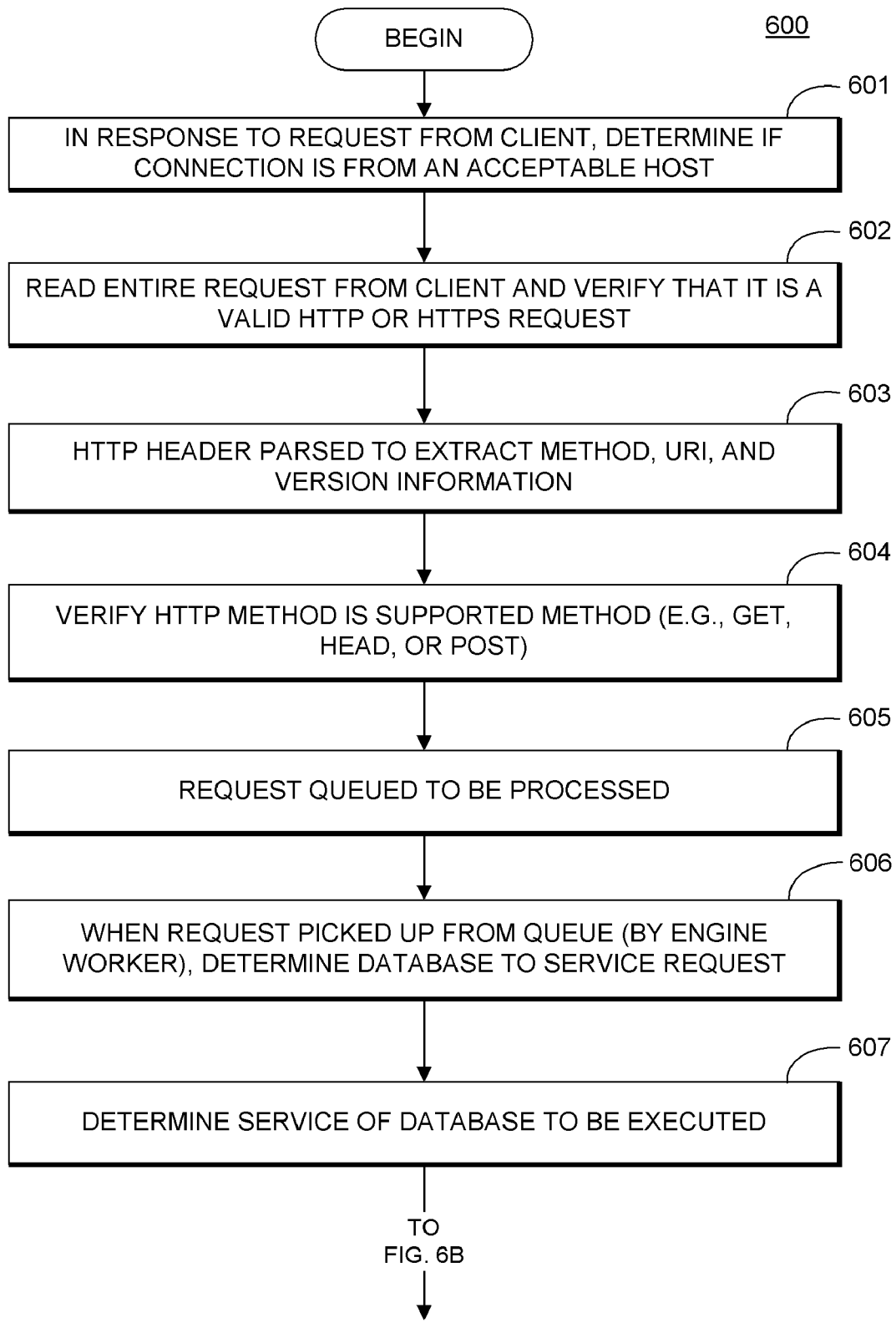
FIGS. 6A-B comprise a single flowchart illustrating in further detail the steps taken for service determination in response to a request received at the database server.
Figure 6B:
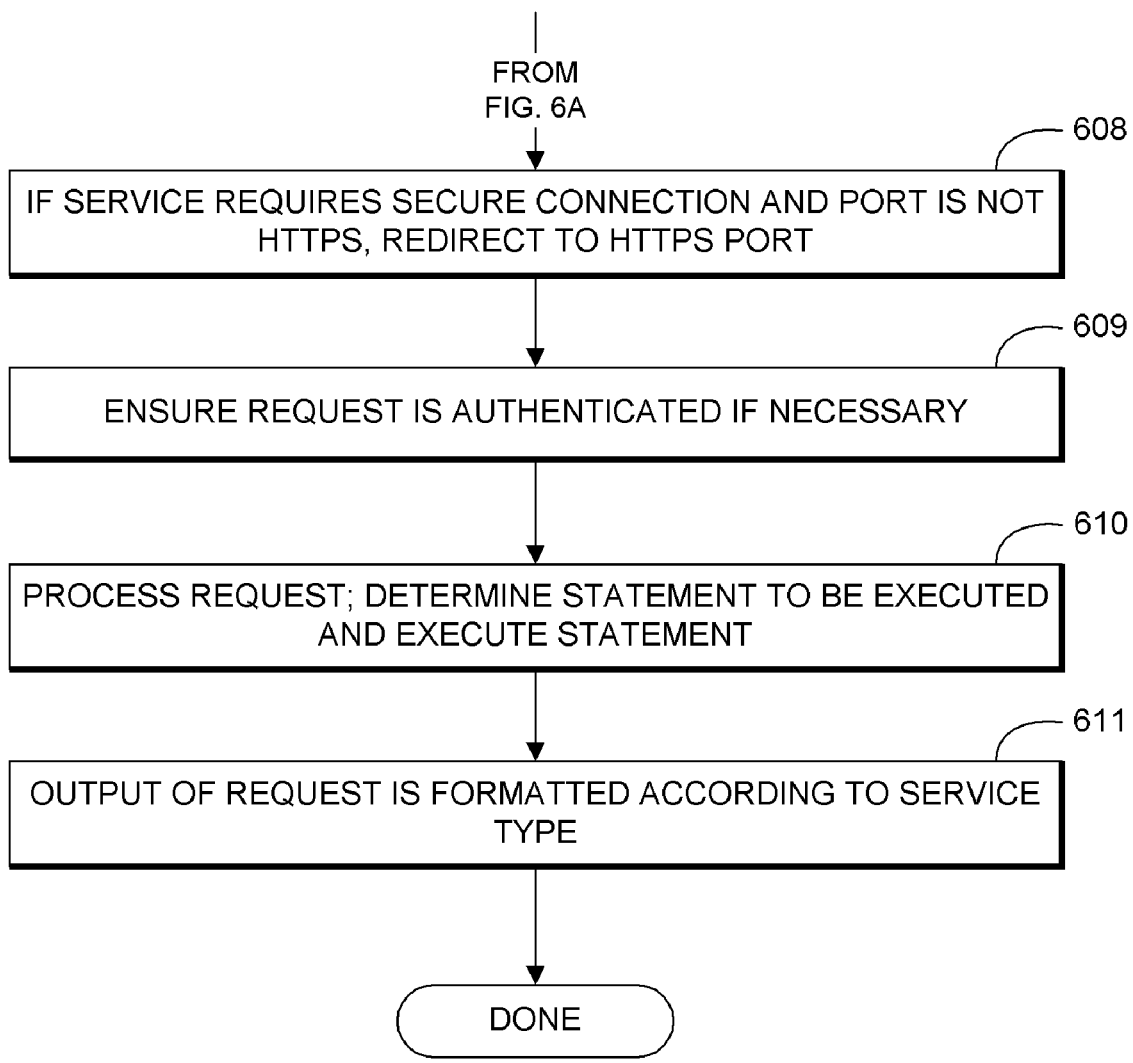

FIGS. 6A-B comprise a single flowchart 600 illustrating in further detail the steps taken for service determination in response to a request received at the database server. At step 601, a check is made to determine whether the connection is from an acceptable host when a request is received. If so, the entire request from the client is read at step 602. As the request is read it is checked to verify that it is a valid HTTP or HTTPS request. At step 603, the HTTP header is parsed to extract the method, URI, and version information. In the currently preferred embodiment, a check is also made to verify that the HTTP method is one of GET, HEAD, or POST at step 604. This is necessary as these are the only methods currently supported in the currently preferred embodiment of the system. When this is complete, the request is queued to be processed at step 605.

When the queued request is picked up by an engine worker several additional steps are performed. At step 606, a determination is made as to which database is to service this request. If the port -xs DBN parameter specified a database name, then the database having this name is used. If the DBN parameter is required, the first element is extracted from the URI and used as the database name. Otherwise, the first URI element is extracted from the request and a determination is made as to whether it is the name of a loaded database. If the name is not determined by the above steps, then the name of the server's default database is used. If the named database is not loaded, then a "404 Not Found" error is returned.

After the database has been determined, the service to be executed is determined by looking up the service information in a "SYSWEBSERVICE" table at step 607. If no service name has been specified in the URI, then a default "root" is used. If the named service does not exist, a "404 Not Found" error is returned. Next, a check is made to determine if the service requires a secure connection. If the service requires a secure connection and the connected port is not HTTPS, then at step 608 it is redirected to the HTTPS port by issuing a "301 Moved Permanently" response. In the event that no HTTPS port has been started, a "403 Forbidden" error is returned.

At step 609, the system ensures that the request is appropriately authenticated if necessary. If authentication is required and no authentication information has been given, a "401 Unauthorized response" will be given (Note: this response will cause most browsers to prompt for the user id and password). A 401 error is also returned if an invalid user id or password is given.

If the above steps are successfully completed, the request is processed at step 610. At this step if the service type is DISH and the URI parameter field contains "wsdl", then the WSDL description of the associated SOAP services is generated. Otherwise, the "SOAPAction" HTTP header specifies the SOAP service to be executed and the request is handled as a SOAP request (as described below). For all of the other service types (e.g., SOAP, XML, HTML, and RAW) the statement that is to be executed is determined and executed. The statement to be executed is generally defined by the service or, if it is null, the URI parameters field. At step 611, the output of the request is formatted according to the service type. The output is formatted as follows:

XML: if the result set is not formatted (by the query) as XML, then the result set is formatted as if FOR XML RAW was added to the query.

HTML: the result set is formatted as an HTML table.

RAW: each column of the result set is described as a STRING and concatenated together as one byte stream.

SOAP: the result set is formatted as an SOAP XML response.

WSDL: the output is a WSDL XML document.

The default is to convert all non-binary output from the database character set to the character set requested by the client (HTTP header "Accept-Charset"). If charset conversion is not wanted, the result column is cast to BINARY and/or the result type of the procedure is described as BINARY. Alternatively, a dbo.sa_set_http_option('Charset-Conversion', 'OFF') can be used. A built-in function "csconvert( )" can be used to convert a selective set of data.

Internal Stored Procedures/Built-in Functions

The following describes some built-in functions (internal stored procedures) provided in the currently preferred embodiment of the system in further detail.

http_header(fieldname): This built-in function can be used to obtain a value for an HTTP header.

dbo.sa_set_http_header(fieldname, value): This is an internal stored procedure that allows the Web service to set an HTTP header in the result. The special header named "@HttpStatus" may be set to supply the HTTP status code that is to be returned by the request. For example, if the service wants to indicate a "404 Not Found" return code, it can use dba.sa_set_http_header('@HttpStatus', '404'). If the given status code is invalid, a SQL error is issued. It is up to the stored procedure to fill in the body of the response appropriately for the given status code.

dbo.sa_set_http_option(optionname, value). This is an internal stored procedure that allows the Web service to set an HTTP option. Currently only one option is defined: "CharsetConversion"—either "ON" or "OFF" (default "ON") —specifies whether the output is to be converted from the database character set to the client character set.

http_variable(varname [, i]): This built-in function returns the value of the i'th host variable value associated with the given name. If "i" is omitted, it defaults to 1. This routine can be useful when a multiple select list is used in an HTML form and the request has specified more than one value. There are three special variables that allow access to the HTTP request information: "@HttpMethod"—the HTTP method being used (GET, POST, or HEAD); "@HttpURI"—the full HTTP URI of the request; and "@HttpVersion"—the HTTP version string specified in the request.

next_http_header(name): This built-in function iterates over the list of HTTP headers that are defined in the HTTP request. If name is NULL then the name of the first header is returned. If name is not NULL then the next name is returned. If the return value is NULL then the end of the list is reached.

next_http_variable(name): This built-in function iterates over the list of host variables that are defined in the HTTP request. If name is NULL then the first variable name is returned. If name is not NULL then the next name is returned. If the return value is NULL then the end of the list is reached.

Program Code Embodiment

1. HTTP Connection

In the currently preferred embodiment, an "HttpConnection" class may be declared as follows (with line numbers being added for convenience of discussion).

```
32:    class HttpConnection {
33:    public:
34:        HttpConnection * __next;
35:    protected:
36:        HttpSocket *     __socket;
37:        HttpSockOStream * __stream;
38:        HttpConnectionState __state;
39:        HttpProtocol *   __protocol;
40:        HttpRequest *    __request;
41:        HttpListener *   __listener;
42:        HttpString       __rmt_addr;
43:        HttpString       __lcl_addr;
44:        HttpString       __rxline;
45:        char *           __dbname;
46:        HttpString       __dbConnected;
47:        char *           __rxbuffer;
48:        char *           __decrypt_buffer;
49:        char             __last;
50:        HttpRxCompletion * __rxcomplete;
51:        HttpTxCompletion * __txcomplete;
52:        uint32           __request_size;
53:        uint32           __pkts_received;
54:        a_fast_tod       __last_read_time;
55:        a_bool           __ignore_receive;
56:        a_bool           __dbname_required;
57:        a_bool           __dbname_provided;
58:        a_web_protocol_type __type;
59:    public:
60:        HttpConnection( SysSocket sock, char *dbn, a_web_protocol_type type,
61:           HttpListener *l, char *lcl_addr, char *rmt_addr );
62:        ~HttpConnection( );
63:        void    Start( void );
64:        void    Stop( a_bool on_worker = FALSE );
65:        void    DelayedStop( void );
66:        void    RequestFinished( void );
67:        void    CleanUp( void );
68:        void    ProcessSend( int err, mt datalen );
69:        a_bool  Process Line( char * rxbuffer, int * offset, int datalen );
70:        void    ProcessRecv( int err, int datalen );
71:        void    ProcessData( char *, int );
72:        void    ProcessHttpsRecv( a_bool force = FALSE );
73:        void    IgnoreReceive( );
74:        a_web_protocol_type GetType( void ) const { return __type; }
75:        char *  GetDbName( void ) const { return __dbname;
}
76:        a_bool  DBNameRequired( void ) const { return __dbname_required;
}
77:        a_bool  DBNameProvided( void ) const { return __dbname_provided;
}
78:        char *  GetDbConnected( void ) const { return __dbConnected.c_str( ); }
79:        void    SetDbConnected( char *str ) {
80:            __dbConnected.clear( );
81:            __dbConnected.append( str );
82:        }
83:        HttpListener * GetListener( void ) const { return __listener;
}
84:        HttpProtocol * GetProtocol( void ) con St { return __protocol;
}
85:        HttpRequest *  GetRequest( void ) const { return __request;
}
86:        HttpOrderedList * GetVariables( void ) const { return __request->GetVariables( ); }
87:        a_bool  ParseRequestString( HttpRequest *request, HttpString *str );
88:        a_bool  ParseHeaderString( HttpRequest *request, HttpString *str );
89:        a_bool  ParseURI( HttpRequest * request );
90:        a_bool  ParseVersion( HttpRequest * request );
91:        a_bool  CanDelete( void );
92:        a_bool  CheckForTimeout( void );
93:        a_bool  SendHttpHeaders( HttpRequest *request, HttpOStream *stream );
94:        a_bool  Send HttpError( HttpRequest *request, HttpOStream *stream );
95:        a_bool  SendSQLError( HttpRequest *request, HttpOStream *stream );
96:        a_bool  IsSecure( void ) const;
97:        void    UpdateReceivedConnProperties( p_Connection ) const;
98:        void    UpdateSentConnProperties( p_Connection ) const;
99:        void    GetRemoteMachineAddr( char *buf, int32 buf len );
100:       uint32  GetIdleTimeout( void ) const;
101:       a_fast_tod GetLastRequestTime( void ) const { return __last_read_time; }
102:       HttpString *GetLocalMachineAddr( void ) { return &__lcl_addr; }
103:       int64   GetBytesWritten( void ) const { return __socket->getBytesWritten( ); }
104:   protected:
105:       HttpSockOStream * GetStream( ) const { return __stream; }
106:       friend class HttpListener;
107:       friend class HttpProtocol;
108:   private:
109:       void    StartRequest( );
110:   };
```

As shown at line 34, the class includes a linked list (data member) to other HTTP connections. At line 36, the class includes a data member that is an object of an "HttpSocket" class, which is a simple wrapper for the system's internal socket mechanism. To communicate with the outside world, the presentation layer uses an output stream, "HttpSockOStream", declared at line 37. The connection state itself is tracked by state variable "HttpConnectionState", at line 38. "HttpListener" (line 41) represents a pointer to a listener object, which resides in the communication layer and listens for incoming requests. Whenever a new connection comes in, the listener creates a new connection object. Addresses for the connection are stored as strings (at lines and 42-43). Other housekeeping information is maintained by data members through line 58, as shown; these maintain connection state information. Also shown in the class definition are various class methods (prototypes) at lines 59-110. These implement conventional processing steps for maintaining connections and the aforementioned state information.

Of interest are the following two class methods, "SetHTTPHeaderField" and "SetHTTPOption".

```
1291: a_bool Connection::SetHTTPHeaderField( char * fldname,
char * val )
1292: /*******************************************************
**************/
1293: {
1294:     a_bool result = FALSE;
1295:     if( http_conn != NULL && fldname != NULL &&
*fldname != '\0' ) {
1296:         result = http_conn->GetProtocol( )->SetResponse
Header( fldname, val
== NULL ? "" : val );
1297:     }
1298:     return( result );
1299: }
1300:
1301:
1302:
1303:
1304: a_bool Connection::SetHTTPOption( char * optname,
char * val )
1305: /*******************************************************
********/
1306: {
1307:     a_bool result = FALSE;
1308:     if( http_conn != NULL && optname != NULL &&
*Optname != '\0' ) {
1309:         result = http_conn->GetProtocol( )->SetHTTPOption(
optname,
1310:             (char *)( val == NULL ? "" : val ) );
1311:     }
1312:     return( result );
1313: }
```

"SetHTTPHeaderField" and "SetHTTPOption" are internal functions that allow one's stored procedure to set HTTP header information. For example, when one calls the system-level stored procedure ("sa_set_http_option") in one's own stored procedure, the call (see, e.g., line 1273 in program code appendix) is routed to "SetHTTPOption" (see, e.g., line 1280 in program code appendix). As shown, the "SetHTTPHeaderField" and "SetHTTPOption" methods themselves are stub functions that call through to the actual respective setter/getter methods in the "HttpConnection" class (which in turn update the respective hash tables).

The "SetResponseHeader" method is used in a corresponding manner to set HTTP response header information; it may be implemented as follows.

```
1336: a_bool HttpProtocol::SetResponseHeader( const char
* key, const char
* value )
1337: /*******************************************************
**************/
1338: {
1339:     _assertD( key != NULL );
1340:     if( *key == '@' ) {
1341:     // special values
1342:     if( _strieq( key, "@HttpStatus" ) ) {
1343:         // value had better be the numeric status code
1344:         int v = atoi( value );
1345:         int i = StatusLineIndex( v );
1346:         if( i == LEVEL_600 ) {
1347:         // invalid value
1348:             return FALSE;
1349:         }
1350:         SetHttpStatus( (HttpStatus)v );
1351:         return TRUE;
1352:     }
1353:     }
1354:     // check that the key and value consists of valid
HTTP characters
1355:     const char * s;
1356: #define IS_HTTP_TOKEN_CHAR( c ) ( (c)>' ' && (c)<=
'~' &&
!IsHttpSeparator( c ) )
1357: #define VALID_HTTP_KEY_CHAR( c ) IS_HTTP_
TOKEN_CHAR( c )
1358: #define VALID_HTTP_VAL_CHAR( c ) ( ((c)>=' ' && (c)
<='~') ||
(c)=='\t' )
1359:     // TBD: we need to handle LWS (continuation lines)
in the field
values
1360:     for( s=key; *s != '\0'; s++ ) {
1361:         if( !VALID_HTTP_KEY_CHAR( *s ) ) {
1362:             return FALSE;
1363:         }
1364:     }
1365:     for( s=value; *s != '\0'; s++ ) {
1366:         if( !VALID_HTTP_VAL_CHAR( *s ) ) {
1367:             return FALSE;
1368:         }
1369:     }
1370:     _response.Set( key, value );
1371:     return TRUE;
1372: }
```

Of interest, the program logic to set the HTTP status (beginning at line 1342) is where the system deduces whether it can return a special HTTP code (e.g., HTTP code 401). The remainder of the method ensures that the HTTP "key" part of the header is valid, and will raise an SQL error if it is not.

2. HTTP Presentation

In the currently preferred embodiment, an "HttpPres" (presentation) class may be declared as follows:

This class serves as a base class for several other classes in the system (e.g., "HttpPresXML"). Once a connection is set up to the database and before a statement is executed, the system sets up the presentation layer so that when the statement begins executing and returning data, the system can stream that data back to the client through the presentation layer. The presentation layer, in turn, formats that data in an appropriate manner.

The "HttpOStream" data member (line 117) provides access to an output stream, for returning data to the client. In order to track what character (collation) set should be applied, the class includes a "UTCollation" data member at line 118 (for use in cases where the outgoing character sets differs from that used by the database). The result set gets described before it is outputted, by data members at lines 124-127. For example, the "descriptor count" (line 124) contains the number of columns that are going to be returned. Similarly, the row and column counter variables (lines 125-126) track the number of rows and columns as they are being outputted. Variables from lines 128-131 indicate current context/position within the output document.

Various in-line "put" methods are defined from lines 135-163 for outputting data; as shown, these call into base "put" methods at lines 133-134. Parameter flags are employed to indicate when HTTP encoding ("HF_ENC" flag) and HTTP character set conversion ("HF_CONV" flag) is required. By default, the "put" methods encode and convert data in an appropriate manner. However, some of the methods omit these flags for instances where encoding/conversion is not desirable (e.g., outputting binary data). The current state of the presentation layer is available by invoking "HttpPresStatus" (line 186) and "PresStatusOk" (line 190). Since this class is a base class for several other classes, it defines an interface (i.e., virtual methods) at lines 260-275 for the methods that will be implemented by subclasses. Therefore, the "HTTP-Press" class provides implementation only for the basic book-keeping common to all different presentation types.

3. HTTP Protocol

In the currently preferred embodiment, an "HttpProtocol" class may be declared as follows:

```
347: class HttpProtocol {
348:    private:
349:        HttpPhase    _phase;    // current phase of the request
350:        a_perf_tod   _tod_connected;    // time of day client connected
351:        a_perf_tod   _tod_queued;    // time of day request was queued
352:        a_perf_tod   _tod_started;    // time of day request was started
353: // a_perf_tod   _tod_finished;    // time of day request was finished
  = time it is logged
354:        HttpString   _method;
355:        HttpString   _uri;
356:        HttpString   _version;
357:        HttpHashTable _request;    // table of headers in request
358:        HttpHashTable _response;    // table of headers to send in response
359:        HttpHashTable _options;    // table of options
360:        HttpString   _lastHeaderKey;    // if value is continued on next line,
361:                                     // we need to know what to append it to
362:        HttpStatus   _status;
363:        HttpString   _errorstr;
364:        /*
365:        _body_expected is whether or not we're expecting a body with this request.
366:        _body_expected_length is the expected length of the body (based on HTTP headers).
367:        _body.length( ) is the actual length of the body received so far.
368:        */
369:        HttpString   _body;
370:        a_bool       _body_expected;
371:        uint32       _body_expected_length;
372:        HttpConnection * _connection;
373:        HttpLogger * _logger;
374:        a_bool       _has_been_logged;
375:        void         SetDateHeaders( void );
376:        a_bool       _send_headers;
377:        a_bool       _send_body;
378:        a_bool       _content_type_set;
379:        friend class HttpRequest;
380:        friend class HttpLogger;
382:        HttpProtocol( HttpConnection * connection, HttpLogger * logger );
383:        ~HttpProtocol( );
384:        HttpPhase    GetPhase( void )    { return( _phase ); }
385:        a_perf_tod * GetTodConnected( void )    { return( &_tod_connected ); }
386:        a_perf_tod * GetTodQueued( void )    { return( &_tod_queued ); }
387:        a_perf_tod * GetTodStarted( void )    { return( &_tod_started ); }
388:        void         SetReqQueued( void );
389:        void         SetReqStarted( void );
390:        void         SetReqFinished( void );
391:        void         SetOkToDelete( void );
392:        const HttpString * GetMethod( ) const { return &_method; }
393:        const HttpString * GetUri( ) const { return &_uri; }
394:        const HttpString * GetVersion( ) const { return &_version; }
395:        /*
396:        Request header methods
397:        */
398:        void         SetRequestHeader( const char *key,
399:                     const HttpString *value ) {
400:        _request.Set( key, value->str( ), value->length( ) );
401:        _lastHeaderKey.clear( );
402:        _lastHeaderKey.append( key );
403:        }
404:        void         SetRequestHeader( const char *key,
405:                     const char *value,
406:                     const size_t len ) {
407:        _request.Set( key, value, len );
408:        _lastHeaderKey.clear( );
409:        _lastHeaderKey.append( key );
410:        }
411:        a_bool       AppendRequestHeader( HttpString &value );
412:        HttpString * GetRequestHeader( const char * key ) {
413:        return _request.Get( key );
414:        }
415:        HttpString * GetRequestNextKey( const char * key ) {
416:        return _request.GetNextKey( key );
417:        }
418:        /*
419:        Response header methods
420:        */
421:        void         SetResponseHeader( const char * key, const HttpString * value )
422:                     { _response.Set( key, value->str( ), value->length( ) ); }
423:        a_bool       SetResponseHeader( const char * key, const char * value );
424:        HttpString * GetResponseHeader( const char * key ) { return _response.Get( key ); }
425:        a_bool SetHTTPOption( char * optname, char * value );
426:        HttpString * GetHTTPOption( char * optname )    { return( _options.Get( optname ) ); }
427:        a_bool       ContentTypeSet( void ) const { return _content_type_set; }
428:        // _status methods
429:        void         SetHttpStatus( HttpStatus status ) { _status = status; }
430:        void         SetHttpStatus( HttpRequestState state );
431:        HttpStatus   GetHttpStatus( void ) const    { return _status; }
432:        char *       GetHttpStatus( char * buf, size_t len ); // get status string
433:        void         SetErrorString( const char * str, const size_t len );
434:        const HttpString * GetErrorString( void ) const    { return &_errorstr; }
435:        // _body methods
436:        HttpString * GetBody( void )    { return &_body; }
437:        a_bool       GetBodyExpected( void ) const    { return _body_expected; }
438:        uint32       GetBodyExpectedLength( void ) const { return _body_expected_length; }
439:        a_bool       ParseRequest( const HttpString * request );
440:        a_bool       ParseHeader( const HttpString * header );
441:        a_bool       ParseMethod( void );
442:        a_bool       ParseBodyLength( void );
443:        a_bool       SendHttpHeaders( HttpOStream * stream );
444:        a_bool       SendHttpError( HttpOStream * stream );
445:        void         WriteLogEntry( void );
446:        void         CleanUp( void );
```

```
447:    a_bool    ShouldSendBody( void ) const { return
        _send_body; }
448: #if !PRODUCTION
449:    private:
450:        HttpString    _resbody;
451:    public:
452:        HttpString * GetResBody( void ) { return &_resbody;
}
453: #endif
454: };
```

Of interest, at lines 349-353, the class defines bookkeeping data members for tracking various information about the HTTP connection. Lines 354-356 include data members that track information about the URI itself. Hash tables are established at lines 357-359 for hashing HTTP options and HTTP headers for the request and response. For example, the "request" hash table (line 357) gets populated at the beginning of handling the request. The "response" hash table (line 358) is initially populated by the system with default values, but then the invoked stored procedure may change values in the response (HTTP header) by invoking internal functions (e.g., "SetHTTPHeaderField"). During output, the "Begin-Doc" method (line 260, from the "HttpPres" class) will begin outputting HTTP header information from the response hash table. Also of interest is the "options" hash table at line 359. Here, the stored procedure may set output options (e.g., whether or not to perform character set conversion in the output) for the HTTP response.

4. HTTP Request

In the currently preferred embodiment, an "HttpRequest" class may be declared as follows:

```
459:    class HttpRequest: public RQBaseItem
460:    {
461:        HttpConnection * _connection;
462:        HttpProtocol * _protocol;
463:        HttpOStream * _stream;
464:        HttpService * _service;
465:        HttpService * _dservice;
466:        Database * _db
467:        p_Connection _dbconnection;
468:        p_Worker _worker;
469:        a_bool _cancel;
470:        uint32 _uid;
471:        HttpString * _parms;
472:        HttpRequestState _state;
473:        HttpString _username;
474:        HttpString _password;
475:        HttpString _database;
476:        HttpString _service_name;
477:        HttpString _arguments;
478:        HttpString _url_path;
479:        HttpOrderedList _variables;
480:        a_bool _headers_sent
481:    public:
482:        HttpRequest( HttpConnection * c, HttpProtocol * p,
            HttpOStream *
            s );
483:        ~HttpRequest( );
484:        p_Worker GetWorker( ) { return _worker; }
485:        HttpOrderedList * GetVariables( ) { return &_variables;}
486:        a_bool Connected( ) { return _dbconnection != N
            ULL; }
487:        virtual void do_request( );
488:        void Cancel( );
489:        void CleanUp( );
490:    private:
491:        a_bool ServiceExists( HttpString & name );
492:        a_bool DetermineServiceOptions( );
493:        a_bool ProcessAuthentication( );
494:        a_bool ProcessHttpAuthentication( );
495:        a_bool ProcessBasicAuthentication( const HttpString *
            base64_credentials );
496:        a_bool DatabaseConnect( HttpString &charset);
497:        void DatabaseDisconnect( );
498:        a_bool ParseURl( );
499:        a_bool ParseArgs( HttpHashTable * argtable, HttpString *
            args);
500:        a_bool ParseMultipartFormData( HttpHashTable
            * argtable,
            HttpString * args, char * boundary);
501:        a_bool ParseArguments( HttpHashTable * arg_table);
502:        a_bool ParseBodyArguments( HttpHashTable *
            arg_table);
503:        a_bool GetURLPathArguments( HttpHashTable *
            argtable );
504:        a_bool DoDishRequest( );
505:        a_bool DoQueryRequest( );
506:        a_bool DoWSDLRequest( );
507:        a_bool ParseSoapRequest( );
508:        void RedirectToSecure( );
509:        void UpdateReceivedConnProperties( void );
510:        void UpdateSentConnProperties( void );
511:        void ReportSQLError( HttpPres * pres );
512:        void SendHttpHeaders( );
513:        void MakeURI( HttpString * host, HttpService * s
            vc,
            HttpString & uri );
514:    };
```

This class derives from an "RQBaseItem" class, which is an internal system class that represents any sort of query or statement that is executed in the database engine. In particular, the parent class represents any item that exists in the worker thread queue. Worker threads retrieve items from this request queue for execution in the database engine. Accordingly, incoming requests are placed in the request queue so that they may be picked up by the foregoing mechanism for execution in the database engine. At lines 461-465, the class defines various bookkeeping data members for tracking the connection, the protocol, and the output stream. At lines 464-465, two pointer variables are defined for tracking services. This provides an entry into the Web services table, for indicating the specific Web service being executed. At lines 466-467, the class defines pointers for the internal database and to the internal temporary connection (pseudo connection). Therefore, the actual connection to the database is kept at the level of an instantiated HttpRequest object. Lines 473-478 include data members that store information parsed out of the request, including for example username and password used for the connection. Parameter information from the request is stored by the "params" data member (line 471). From the foregoing information, the system is able to log into the database and look up the requested Web service (using the service name).

The "DoQueryRequest" method of the "HttpRequest" class may be implemented as follows.

At the point that this method is invoked, the system has already connected to the database. After parsing the arguments of the request, the method sets up the presentation layer. Lines 533-546 examine different parts of the incoming request. Beginning at line 555, the method includes a "switch" statement to determine what type of service is actually involved in the incoming request. The "switch" statement includes different case arms for handling the different types of services (e.g., setting up the appropriate type of presentation layer).

At line 588, the method begins preparing the statement for use in the database engine. In order to execute the query statement in the database engine, the system first creates an expression. The method creates this expression at line 592 and "prepares" it at line 601. Beginning at line 627, the method sets up a database cursor. A subroutine call to "dbi_describe_statement" (line 632) describes the output to the presentation layer (e.g., how many columns will be in the output, and the like). In terms of actual execution, the stored procedure begins execution upon invocation of the "dbi_resume_procedure" subroutine, up to a point where a result set is about to be returned, as this allows the method to determine what in fact the result set is going to be. Thereafter, complete execution of the procedure may occur/resume, at line 639. After execution, the method checks for any error conditions. At line 654, the method instructs the presentation layer to dump/send the outgoing HTTP headers. Beginning at line 665, the method instructs the protocol (object) to start sending the HTTP body. Thereafter, the method may perform cleanup (e.g., cleanup database cursor) and is done.

The "do_request" method of the "HttpRequest" class may be implemented as follows.

After the incoming request gets picked up by a worker thread, this method is executed, for processing the request from beginning to end. The method sets up the initial database connection, and determines what options (parameters) the service is invoked with. As shown beginning at line 836, the method sets up the incoming HTTP request headers hash table. At line 846, the above mentioned "DoQueryRequest" method is invoked for all services except for WSDL, which requires separate processing as indicated by the case arm at line 849.

The "ParseURI" method of the "HttpRequest" class may be implemented as follows.

```
879: a_bool HttpRequest::ParseURI( )
880: /***************************/
881: {
882:    HttpStrlStream stream( _protocol->GetUri( ) );
883:    unsigned char c;
884:    a_bool      got_service = FALSE;
885:    _assertD( _database.length( ) == 0 );
886:    _assertD( _service_name.length( ) == 0 );
887:    _assertD( _arguments.length( ) == 0 );
888:    if( !stream.get( c ) || c != '/' ) {
889:    return FALSE;
890:    }
891:    if( _connection->DBNameProvided( ) ) {
892:    _database.append( _connection->GetDbName( ) );
893:    } else {
894:    while( TRUE ) {
895:        if( !stream.get( c ) ) return TRUE;
896:        if( c == '/' ) break;
897:        if( c == '?' ) {
898:        got_service = TRUE;
899:        break;
900:        }
901:        _database.append( c );
902:    }
903:    }
904:    if( !got_service ) {
905:    while( TRUE ) {
906:        if( !stream.get( c ) ) return TRUE;
907:        if( c == '?' ) break;
908:        _service_name.append( c );
909:    }
910:    }
911:    while( stream.get( c ) ) {
912:    _arguments.append( c );
913:    }
914:    return TRUE;
915: }
```

This method parses URI information in a straightforward manner, including checking it for validity. For example, the method validates the database name, service name, and arguments, which are specified for the incoming request.

The "ServiceExists" method of the "HttpRequest" class may be implemented as follows.

```
920: a_bool HttpRequest::ServiceExists( HttpString & name )
921: /******************************************************/
922: {
923:    a_bool       result = FALSE;
924:    HttpService *    svc;
925:    a_statement *    stmt;
926:    p_Database    db = _CurrentDB;
927:    svc = HttpService::Find( db, name.c_str( ) );
928:    if( svc == NULL ) {
929:    // The service by the full name does not exist...
930:    // need to split it up into <name>/<url> pieces
931:    char *         str = name.c_str( );
932:    size_t         len = name.length( );
933:    if( len == 0 ) {
934:        return FALSE;
935:    }
936:    size_t         split = len - 1;
937:    for( ; split > 0; split-- ) { // Note: first char cannot be '/'
938:        if( str[split] == '/' ) {
939:        // split at this point
940:        HttpString tname( str, split );
941:        svc = HttpService::Find( db, tname.c_str( ) );
942:        if( svc != NULL ) {
943:            if( svc->GetUrlPathType( ) != URL_PATH_OFF ) {
944:            // got [name =0..split-1]/[url=split+1..len-1]
945:            len = len - split - 1;
946:            if( len == 0 || svc->GetUrlPathType( ) == URL_PATH_OFF ) {
947:                _url_path.set_empty( );
948:            } else {
949:                _url_path.append( str+(split+1), len );
950:            }
951:            name.resize( split );
952:            break;
953:            } else {
954:            svc->Release( );
955:            svc = NULL;
956:            }
957:        }
958:        }
959:    }
960:    if( split == 0 ) {
961:        return FALSE;
962:    }
963:    }
964:    if( svc != NULL ) {
965:    _uid = svc->GetUid( );
966:    stmt = svc->LockStmt( );
967:    if( stmt != NULL ) {
968:        p_expr stmtstr;
969:        uint32 len;
970:        stmtstr = Prep_to_str( NULL, stmt );
971:        stmtstr = an_ExprBuilder::GblBuilder.DB_Find_expr( stmtstr, FALSE );
972:        len = (uint32) stmtstr->v.str->length( );
973:        _parms = new HttpString( len + 1 );
974:        {
975:        // Copy string to _parms
976:        DbStrlStream s( *stmtstr->v.str, _CurrentConnection );
```

```
977:    s.get( (a_byte *) _parms->str( ), (uint32)
stmtstr->v.str->length( ));
978:    _parms->resize( len );
979:    }
980:    DE_Free_expr( stmtstr );
981: }
982: svc->UnlockStmt( );
983: result = TRUE;
984: }
985: _service = svc;
986: return result;
987: }
```

This method confirms that a corresponding service exists for the incoming request. At lines 937-959, a loop is established that tries to split up the URL (URI) path, for determining which service to use. These process steps are influenced by the URL path option, as shown.

5. HTTP Presentation XML

In the currently preferred embodiment, an "HttpPresXML" (presentation for XML) class may be declared as follows:

```
1007: class HttpPresXML : public HttpPres {
1008: protected:
1009:   UTCollation *    _col;          // db's collation
1010:   a_bool           _has_xml;      // db has XML typeid /
1011:   uint16           _xml_typeid;
1012:   a_bool           _saw_xml;      // we saw some XML columns
1013:   a_bool           _do_xml_formatting; // we need to do
the formatting
1014:   CacheCarver *    _carver;
1015:   p_col_name       _first_col;
1016:   p_col_name       _current;      // "cur" column i.e. column
[_cur_idx]
1017:   uint16           _cur_idx;
1018: public:
1019:   HttpPresXML( HttpOStream * ostream, UTCollation
* col );
1020:   virtual ~HttpPresXML( );
1021: protected:
1022:   virtual void AddColumn(
1023:     char *     table_name,
1024:     char *     coln_name,
1025:     uint16     coln_namelen,
1026:     uint32     asa_usertype );
1027:   virtual void BeginDoc( void );
1028:   virtual void BeginResultSet( void ); // start of result
set
(table)
1029:   virtual void BeginRow( void );
1030:   virtual void BeginColumn( void );
1031:   virtual void EndColumn( void );
1032:   virtual void EndRow( void );
1033:   virtual void EndResultSet( void );    // end result set
(table)
1034:   virtual void EndDoc( void );
1035:   virtual void SendColumnValue( void * data, uint32
len);
1036:   virtual void SendColumnMultiPiece( void * data, uint32
len);
1037:   virtual void SendSQLError( void * errmsg, size_t len
);
1038:   virtual void NoContentDocBody( void ); // called
when doc has no
content
1039: };
```

A shown at line 1007, this class is derived from the previously-described "HttpPres" class. Of interest is the "_do_xml_formatting" variable declared at line 1013. If the result set is already formatted as XML internally by the engine, then no additional formatting is done. Otherwise, the presentation layer formats the result set as XML. This allows the stored procedure (in the case of an XML service) to specify whether the XML should be formatted internally by the engine (i.e., the engine directly returns an XML result set) or be formatted by the presentation layer.

Beginning at line 1027, the class begins declaring the methods inherited from the base class ("HttpPres") that it will implement. In the case of the "HttpPresXML" class, these methods serve to make sure that the output is formatted as a valid XML document. For example, the "BeginRow" and "EndRow" methods may be implemented as follows:

```
1165: void HttpPresXML::BeginRow( void )
1166: /*********************************/
1167: {
1168:   if( _do_xml_formatting ) {
1169:     PutAsc( "<row" );
1170:     _current = _first_col;
1171:     _cur_idx = 0;
1172:   }
1173: }
...
1195: void HttpPresXML::EndRow( void )
1196: /*********************************/
1197: {
1198:   if( _do_xml_formatting ) {
1199:     PutAsc( "/>\n" );
1200:   }
1201: }
```

As shown, these methods apply specific XML tags to row data (in instances where the presentation layer is responsible for XML formatting).

Similarly, the "BeginColumn" and "EndColumn" methods may be implemented as follows:

```
1174: void HttpPresXML::BeginColumn( void )
1175: /*********************************/
1176: {
1177:   if( _do_xml_formatting) {
1178:     for(; _cur_idx < _col _ctr; _cur_idx++ ) {
1179:       _assertD( _current != NULL);
1180:       _current = _current->next;
1181:     }
1182:     _assertD( _current != NULL);
1183:     PutAsc( ' ' );
1184:     PutData( _current->name, _current->len, HF_COL
NAME );
1185:     PutAsc( "=\"" );
1186:   }
1187: }
1188: void HttpPresXML::EndColumn( void )
1189: /*********************************/
1190: {
1191:   if( _do_xml_formatting ) {
1192:     PutAsc( "" );
1193:   }
1194: }
```

Here, the methods output, for example, the column name and length in a manner suitable for XML output. Implementation methods servicing other types, such as raw and HTML, are implemented in a similar manner (i.e., outputting the data in a manner required by the type's particular format).

While the invention is described in some detail with specific reference to a single-preferred embodiment and certain alternatives, there is no intent to limit the invention to that particular embodiment or those specific alternatives. For instance, although the currently preferred embodiment focuses on servicing HTTP requests, those skilled in the art will appreciate that the system may be easily modified to support other similar protocols, such as FTP, telnet, or the like. Clearly, it will be appreciated that modifications may be made to the preferred embodiment without departing from the teachings of the present invention.

The invention claimed is:

1. In a database system, a method for providing a stored procedure as a Web service, the method comprising:
predefining a stored procedure to be invoked upon receiving a client request for a particular Web service;
receiving an incoming request from a particular client for the particular Web service at an HTTP server built into database engine of the database system;
in response to the incoming request, identifying the stored procedure that is predefined for the particular Web service;
executing the identified stored procedure for generating a result set, wherein said executing step includes creating a temporary pseudo connection to the database engine of the database system, and executing the stored procedure asynchronously through said temporary pseudo connection with respect to incoming requests; and
returning the result set back to the particular client.

2. The method of claim 1, further comprising:
upon receiving the incoming request, verifying that the request comprises a valid HTTP request for a Web service.

3. The method of claim 1, wherein client requests employ HTTP protocol.

4. The method of claim 3, wherein client requests further specify a selected one of XML, SOAP, WSDL, and raw format.

5. The method of claim 1, wherein said returning step further comprises:
formatting the result set into a particular presentation format; and thereafter
returning the formatted result set back to the particular client.

6. The method of claim 1, wherein the incoming request comprises a URL.

7. The method of claim 6, wherein the URL includes parameter information affecting how the identified stored procedure is executed.

8. The method of claim 1, wherein the identified stored procedure may include any valid SQL statement.

9. The method of claim 1, wherein the identified stored procedure itself may invoke other stored procedures.

10. The method of claim 1, wherein the identified stored procedure selects data from a database, and wherein the result set returned to the particular client comprises that data formatted in a manner suitable for return via HTTP protocol.

11. The method of claim 10, wherein the data is formatted for return as XML-formatted data.

12. The method of claim 11, wherein the result set comprises a plurality of database rows, and wherein the XML-formatted data comprises said plurality of database rows delimited with XML tags.

13. The method of claim 1, wherein the identified stored procedure itself may set HTTP header information that is returned to the particular client.

14. The method of claim 1, wherein the incoming request is received via a selected one of HTTP, FTP, and telnet protocol.

15. The method of claim 1, wherein the system first checks user authentication for the particular client before executing the identified stored procedure.

16. A computer-readable medium having processor-executable instructions for performing the method of claim 1.

17. The method of claimed 1 further comprising:
a downloadable set of processor-executable instructions stored on computer-readable medium for performing the method of claim 1.

18. A database system providing stored procedures as Web services, the system comprising:
a database engine store on a computer-read medium, which when executed controls a database that includes a stored procedure to be invoke upon receiving a request for a particular Web service;
a communications layer for receiving an incoming request from a particular client for the particular Web service;
an HTTP server built into a database engine of the database system for parsing and validating the incoming request;
a request layer of the database system for identifying the store procedure corresponding to the particular Web service and executing the identified stored procedure for the particular Web service, for generating a result set, wherein the request layer creates a temporary pseudo connection to the database engine of the database system, and executes the stored procedure asynchronouly through said temporary pseudo connection with respect to incoming requesting;
a presentation layer of the database system for returning the result set back to the particular client.

19. The system of claim 18, wherein the HTTP server verifies that the incoming request comprises a valid HTTP request for a Web service.

20. The system of claim 18, wherein client requests employ HTTP protocol to communicate with the database system.

21. The system of claim 20, wherein client requests further specify a selected one of XML, SOAP, WSDL, and raw format.

22. The system of claim 18, wherein the presentation layer formats the result set into a particular presentation format before returning the result set to the particular client.

23. The system of claim 18, wherein the incoming request comprises a URL.

24. The system of claim 23, wherein the URL includes parameter information affecting how the identified stored procedure is executed.

25. The system of claim 18, wherein the identified stored procedure may include any valid SQL statement.

26. The system of claim 18, wherein the identified stored procedure itself may invoke other stored procedures.

27. The system of claim 18, wherein the identified stored procedure selects data from the database, and wherein the result set returned to the particular client comprises that data formatted in a manner HTTP protocol.

28. The system of claim 27, wherein the data is formatted for return as XML-formatted data.

29. The system of claim 28, wherein the result set comprises a plurality of database rows selected from the database, and wherein the XML-formatted data comprises said plurality of database rows delimited with XML row tags.

30. The system of claim 18, wherein the identified stored procedure itself may set HTTP header information that is returned to the particular client.

31. The system of claim 18, wherein the incoming request is received via a selected one of HTTP, FTP, and telnet protocol.

32. The system of claim 18, wherein the system first checks user authentication for the particular client before executing the identified stored procedure.

33. The system of claim 18, wherein the request layer includes program logic for translating the request into a form that can be processed by the database engine.

34. The system of claim 18, wherein the incoming request is received over an HTTP connection, and the result set is returned to the particular client over an HTTP connection.

* * * * *